(12) United States Patent
Iwahori

(10) Patent No.: US 10,955,682 B2
(45) Date of Patent: Mar. 23, 2021

(54) SOUND SIGNAL TRANSMITTER AND WIRELESS MICROPHONE

(71) Applicant: Audio-Technica Corporation, Tokyo (JP)

(72) Inventor: Keigo Iwahori, Fukui (JP)

(73) Assignee: Audio-Technica Corporation, Tokyo (JP)

( * ) Notice: Subject to any disclaimer, the term of this patent is extended or adjusted under 35 U.S.C. 154(b) by 0 days.

(21) Appl. No.: 16/775,959

(22) Filed: Jan. 29, 2020

(65) Prior Publication Data

US 2020/0241310 A1      Jul. 30, 2020

(30) Foreign Application Priority Data

Jan. 30, 2019   (JP) .............................. JP2019-013793

(51) Int. Cl.
| | | |
|---|---|---|
| *H04B 10/50* | (2013.01) | |
| *G02B 27/10* | (2006.01) | |
| *G02B 27/12* | (2006.01) | |
| *G02B 27/14* | (2006.01) | |
| *H04R 1/04* | (2006.01) | |
| *H04R 1/08* | (2006.01) | |
| *H04R 3/00* | (2006.01) | |
| *H04R 23/00* | (2006.01) | |

(52) U.S. Cl.
CPC ......... *G02B 27/106* (2013.01); *G02B 27/126* (2013.01); *G02B 27/144* (2013.01); *H04B 10/502* (2013.01); *H04R 1/04* (2013.01); *H04R 1/08* (2013.01); *H04R 3/00* (2013.01); *H04R 23/008* (2013.01); *H04R 2420/07* (2013.01)

(58) Field of Classification Search
CPC .. G02B 27/106; G02B 27/126; G02B 27/144; H04B 10/502; H04B 10/116; H04B 10/1141; H04B 10/1127; H04B 1/0346; H04B 1/0483; H04W 4/80; H04R 23/008; H04R 1/04; H04R 1/08; H04R 3/00; H04R 2420/07
USPC ........................................ 398/130, 131, 132
See application file for complete search history.

(56) References Cited

U.S. PATENT DOCUMENTS

| | | | |
|---|---|---|---|
| 5,323,257 A | | 6/1994 | Abe et al. |
| 6,072,882 A | * | 6/2000 | White .................... H04R 3/005 381/172 |
| 10,362,409 B1 | * | 7/2019 | Dewasurendra ........ G01S 17/58 |
| 2008/0247065 A1 | | 10/2008 | Boyd et al. |
| 2009/0180191 A1 | | 7/2009 | Yamada |
| 2012/0002975 A1 | * | 1/2012 | Nakazawa ............... H04R 1/08 398/132 |
| 2017/0343207 A1 | | 11/2017 | Yim et al. |

FOREIGN PATENT DOCUMENTS

| | | |
|---|---|---|
| JP | H9-051279 A | 2/1997 |
| JP | H9-230281 A | 9/1997 |

\* cited by examiner

*Primary Examiner* — Kile O Blair
(74) *Attorney, Agent, or Firm* — W&C IP

(57) ABSTRACT

A light from a light source is output uniformly in the circumferential direction even if a shift or inclination occurs in a constituent member of a sound signal transmitter. A sound signal transmitter of a microphone includes a light source that outputs a light corresponding to a sound signal from a sound source, a division part that divides the light from the light source into a plurality of divided lights, and a reflector that reflects the divided lights from the division part.

19 Claims, 15 Drawing Sheets

SOUND SIGNAL TRANSMITTER AND WIRELESS MICROPHONE

TECHNICAL FIELD

The present invention relates to a sound signal transmitter and a wireless microphone.

BACKGROUND ART

A wireless microphone (hereinafter, referred to as a "microphone"), which transmits a sound signal to an external device such as an amplifier and a mixer by using infrared communication, is used for, for example, in indoor karaoke, conferences, speeches, and lectures.

In general, a microphone using infrared communication includes an electroacoustic transducer that generates a sound signal corresponding to collected sound and a transmitter that transmits a sound signal with an infrared light output from a light source (for example, a light emitting diode (LED)). The infrared light output from the transmitter is received by light receivers disposed on indoor walls and ceilings. The light receiver having received the infrared light transmits a sound signal converted from the infrared light to an external device such as a demodulator.

When a user grips and uses the microphone, the orientation of the microphone changes depending on, for example, how the user holds the microphone and rotation and inclination due to the use state of the microphone. Therefore, depending on the orientation of the microphone, the direction of the light source (transmission direction (traveling direction) of the infrared light output from the light source) may face a direction other than the direction of the light receiver. In such a case, since the infrared light does not reach the light receiver, the light receiver is unable to receive the infrared light from the microphone. As a result, infrared communication between the microphone and the light receiver is interrupted (the infrared communication is not stable).

Techniques have been proposed to stabilize the infrared communication between the microphone and the light receiver, regardless of the orientation of the microphone (the direction of the light source) (for example, see Japanese Unexamined Patent Application Publication No. H9-51279).

The microphone disclosed in Japanese Unexamined Patent Application Publication No. H9-51279 includes a transmitter using a plurality of LEDs (a plurality of light sources). The LEDs are arranged in a ring shape at equal intervals. Therefore, the transmitter uniformly transmits infrared lights, which are output from all the LEDs, in the circumferential direction of the transmitter. As a result, since the infrared light output from any one of the LEDs is received in the light receiver regardless of the orientation of the microphone, the microphone disclosed in Japanese Unexamined Patent Application Publication No. H9-51279 implements stable infrared communication.

However, when the LEDs are used in the transmitter, current consumption in the infrared communication increases as compared to conventional cases using one LED. In this regard, configurations have been proposed to uniformly output (transmit) an infrared light in the circumferential direction of the transmitter with less current consumption (less power consumption) than current consumption when a plurality of LEDs are used (for example, see Japanese Unexamined Patent Application Publication No. H9-230281).

The transmitter disclosed in Japanese Unexamined Patent Application Publication No. H9-230281 includes one laser diode and a conical reflector each as a constituent member. The laser diode is disposed with respect to the reflector such that an optical axis of a laser beam output from the laser diode is coaxial with an axis (apex) of the reflector. The laser beam output from the laser diode is incident on the reflector. Then, the laser beam incident on the reflector is reflected by the reflector and spreads in a ring shape. As a result, the laser beam is uniformly output in the circumferential direction of the transmitter.

However, in order to dispose the laser diode and the reflector such that the optical axis of the laser beam output from the laser diode is coaxial with the axis of the reflector, extremely accurate positional accuracy is required between the laser diode and the reflector. In other words, when a shift or inclination occurs in a constituent member of the transmitter due to an impact of, for example, a drop at the time of assembly and use of the transmitter, the laser beam is not uniformly output in the circumferential direction of the transmitter. As a result, stable communication is not implemented.

SUMMARY OF INVENTION

Technical Problem

An object of the present invention is to implement stable communication by uniformly outputting light in the circumferential direction of a sound signal transmitter that transmits a sound signal by using light even if a shift or inclination occurs in a constituent member of the sound signal transmitter.

Solution to Problem

The sound signal transmitter according to the present invention includes a light source that outputs a light corresponding to a sound signal from a sound source, a division part that divides the light from the light source into a plurality of divided lights, and a reflector that reflects the divided lights from the division part.

Advantageous Effects of Invention

According to the present invention, even if a shift or inclination occurs in a constituent member of a sound signal transmitter that transmits a sound signal by using a light, stable communication is implementable by a uniform output of the light in the circumferential direction of the sound signal transmitter.

DESCRIPTION OF EMBODIMENTS

Embodiments of a sound signal transmitter and a wireless microphone (hereinafter, referred to as a "microphone") according to the present invention will now be described with reference to the attached drawings.
Wireless Microphone (1)
Configuration of Wireless Microphone (1)

Figure 1:
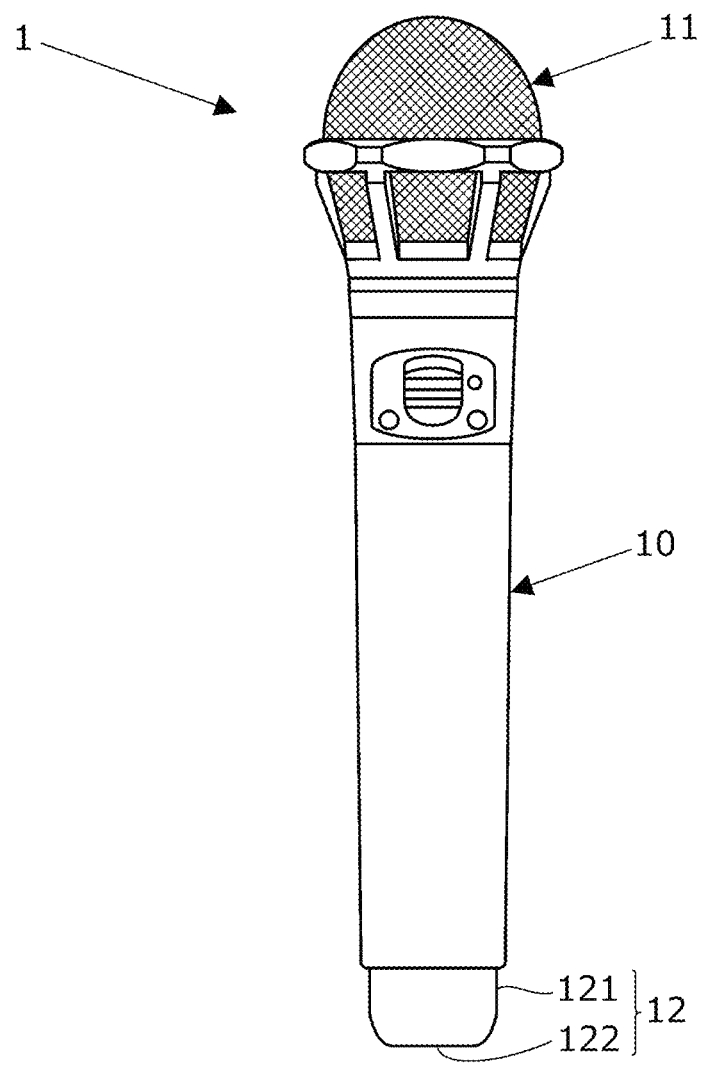
FIG. 1 is a front view illustrating an embodiment of a wireless microphone according to the present invention.

FIG. 1 is a front view illustrating an embodiment of a wireless microphone according to the present invention.

Figure 2:
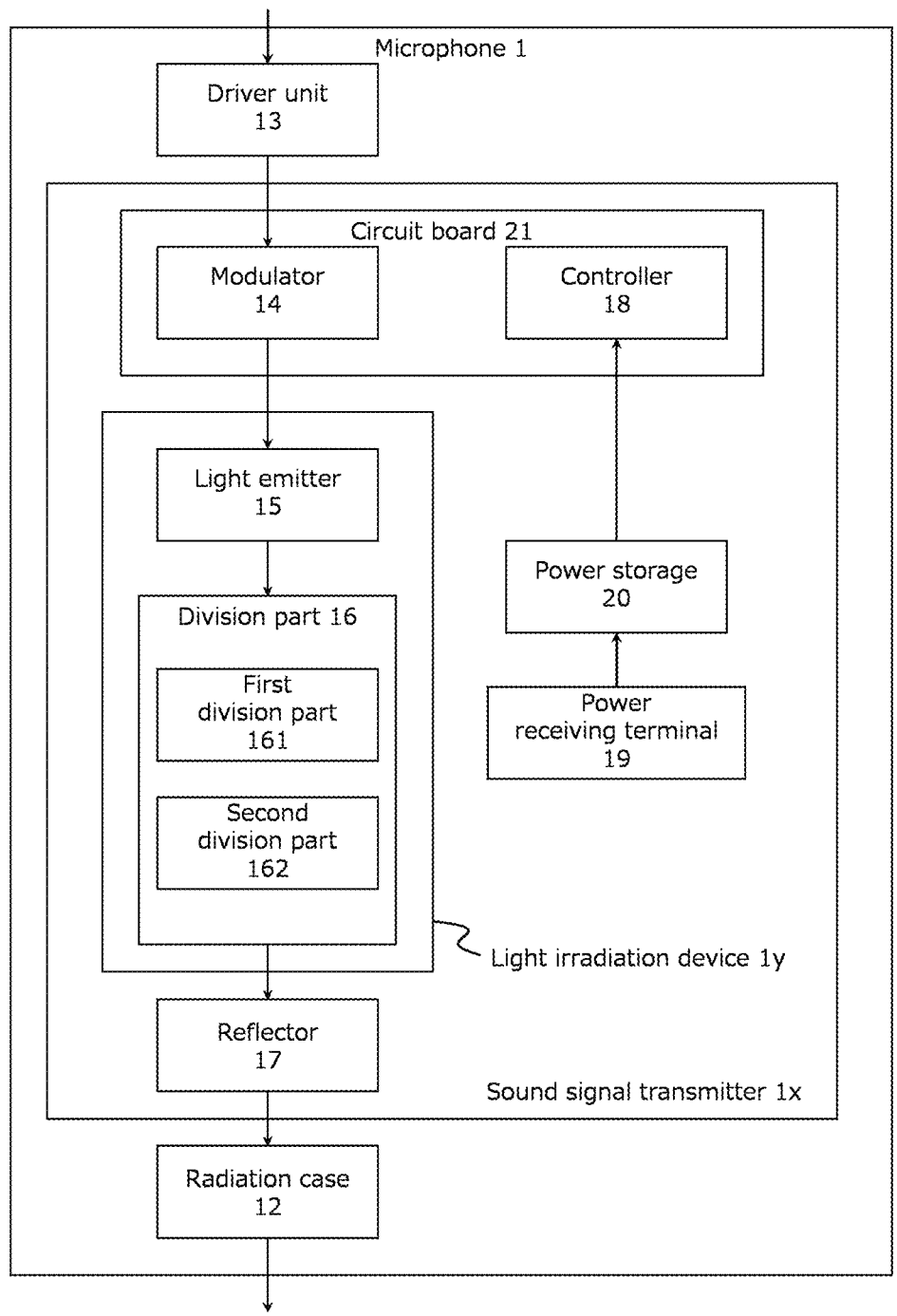
FIG. 2 is a functional block diagram of the wireless microphone of FIG. 1.

FIG. 2 is a functional block diagram of the microphone 1.

The microphone 1 collects sound waves from a sound source (not illustrated), generates a sound signal corresponding to each of the sound waves, and outputs the sound signal. The microphone 1 is, for example, a so-called handheld wireless microphone that transmits the sound signal by using infrared communication indoors. The microphone 1 is gripped by a user of the microphone 1 when used.

The microphone 1 includes a grip housing 10, a head case 11, a radiation case 12, a driver unit 13, a modulator 14, a light emitter 15, a division part 16, a reflector 17, a controller 18, a power receiving terminal 19, a power storage 20, and a circuit board 21. The modulator 14, the light emitter 15, the division part 16, the reflector 17, the controller 18, the power receiving terminal 19, the power storage 20, and the circuit board 21 constitute a sound signal transmitter according to the present invention. The sound signal transmitter 1x generates and outputs a light corresponding to a sound signal from the driver unit 13, thereby transmitting the sound signal, as described later. The light emitter 15, the division part 16, and the reflector 17 constitute a light irradiation device 1y. That is, the sound signal transmitter 1x includes the light irradiation device 1y. The light irradiation device 1y will be described later.

In the following description, "below" refers to a direction (direction on the lower side of the paper of FIG. 1) from the head case 11 to the radiation case 12, regardless of the orientation of the microphone 1. The "orientation of the microphone 1" refers to a posture of the microphone 1, which changes depending on an inclination and the like due to how a user holds the microphone 1 or the use state of the microphone 1.

The grip housing 10 accommodates the modulator 14, the light emitter 15, the controller 18, the power storage 20, and the circuit board 21. The grip housing 10 functions as a grip (gripping part) of the microphone 1. The grip housing 10 is made of, for example, a metal such as an aluminum alloy. The grip housing 10 has a cylindrical shape in which both ends (one end and the other end) are opened. The other end of the grip housing 10 is an end part on the lower side of the grip housing 10. The one end of the grip housing 10 is an end part opposite to the other end of the grip housing 10, that is, an end part on the upper side of the grip housing 10.

The head case 11 accommodates the driver unit 13 and protects the driver unit 13 from dust, wind and the like. The head case 11 is attached to the one end of the grip housing 10.

The radiation case 12 accommodates the division part 16, the reflector 17, and the power receiving terminal 19, and radiates lights reflected by the reflector 17 to the outside of the microphone 1.

Figure 3:
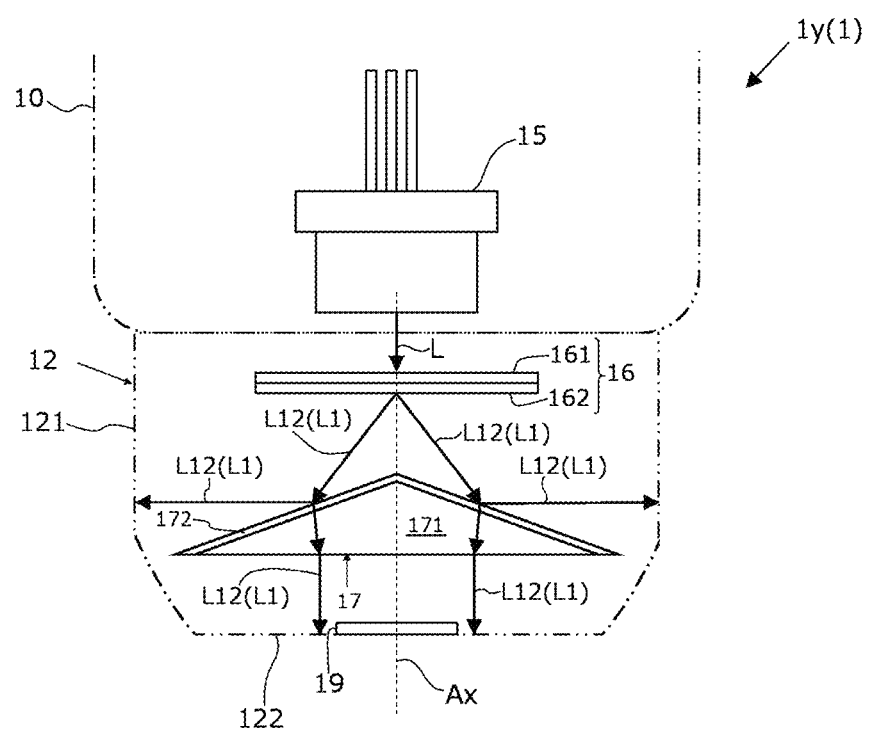
FIG. 3 is a partially enlarged schematic view schematically illustrating a light irradiation device included in a sound signal transmitter constituting the wireless microphone of FIG. 1.

FIG. 3 is a partially enlarged schematic view schematically illustrating the light irradiation device 1y.

FIG. 3 illustrates that the light irradiation device 1y is disposed inside the microphone 1, and the traveling direction of a light irradiated by the light irradiation device 1y is indicated with sold line arrows.

The radiation case 12 has a bottomed cylindrical shape with one end opened, and includes a cylindrical part 121, a bottom part 122, and a diffuser (not illustrated). The opening end of the radiation case 12 is attached to the other end of the grip housing 10. The radiation case 12 is made of, for example, a synthetic resin, such as polycarbonate, which transmits a light (infrared light).

The diffuser diffuses the lights reflected by the reflector 17. The diffuser is, for example, a surface (not illustrated) disposed over the entire inner peripheral surface of the cylindrical part 121 and subjected to a textured surface treatment. The surface subjected to the textured surface treatment has minute irregularities. The lights reflected by the reflector 17 are incident on the textured minute irregularities, and are refracted, diffused, and radiated by the irregularities. That is, the radiation case 12 diffuses the lights reflected by the reflector 17 to radiate the reflected lights to the outside of the microphone 1.

It should be noted that the diffuser it is not limited to the configuration in which the diffuser is disposed over the entire inner peripheral surface of the cylindrical part as long as the diffuser can diffuse lights to be radiated to the outside of the microphone. That is, for example, the diffuser may be disposed at a position corresponding to the lights reflected by the reflector. Furthermore, the diffuser may also be disposed on both surfaces of the inner peripheral surface and outer peripheral surface of the cylindrical part, or only on the outer peripheral surface of the cylindrical part.

Referring back to FIG. 2, the driver unit 13 collects sound waves from the sound source, and generates and outputs a sound signal corresponding to each of the sound waves. The driver unit 13 is, for example, a unidirectional dynamic microphone unit. The driver unit 13 is an example of a microphone unit in the present invention. The driver unit 13 is accommodated in the head case 11. The sound signal from the driver unit 13 is output to the modulator 14.

The modulator 14 generates a modulation signal based on the sound signal from the driver unit 13. The modulation signal is a signal obtained by modulating the sound signal. The modulator 14 modulates the sound signal with respect to a frequency, an intensity and the like in order to transmit the sound signal to the outside. The modulation scheme of the modulator 14 is, for example, a frequency modulation (FM) scheme. The modulator 14 is, for example, a known modulation circuit. The modulator 14 is mounted on the circuit board 21. The modulation signal from the modulator 14 is output to the light emitter 15.

The light emitter 15 emits a light based on the modulation signal from the modulator 14 and carries the sound signal. That is, the light emitter 15 generates and outputs a light corresponding to the sound signal from the driver unit 13 received via the modulator 14. The light emitter 15 is an example of a light source in the present invention. The light emitter 15 is, for example, one laser diode that outputs a light having a wavelength in an infrared band (for example, 840 nm±10 nm). The light emitter 15 is connected to the circuit board 21 and receives the supply of power from the power storage 20 via the circuit board 21.

Referring back to FIG. 3, the light emitter 15 is accommodated on the other end side of the grip housing 10. An optical axis Ax of a light L from the light emitter 15 is supported by a support part (not illustrated) in the grip housing 10 so as to coincide with a center axis (apex) of the reflector 17. The light L from the light emitter 15 is a luminous flux having a predetermined spread angle with respect to the optical axis Ax.

The division part 16 divides the light L from the light emitter 15 into a plurality of divided lights L1, and emits (guides) each of the divided lights L1 to the reflector 17. The division part 16 is disposed between the light emitter 15 and the reflector 17 (in an optical path of the light L from the light emitter 15), and is supported by a support part (not illustrated) in the radiation case 12. The division part 16 is, for example, a synthetic resin sheet-shaped member such as polycarbonate and acryl. The division part 16 includes a plurality of individual division parts (a first division part 161 and a second division part 162). Each of the individual division parts divides the light L incident on the division part 16 into the divided lights L1.

In the following description, when it is not necessary to distinguish and describe the respective individual division parts, each is collectively referred to as the "division part 16". Similarly, when it is not necessary to distinguish and describe the respective divided lights, each is collectively referred to as the "divided light L1".

Figure 4:
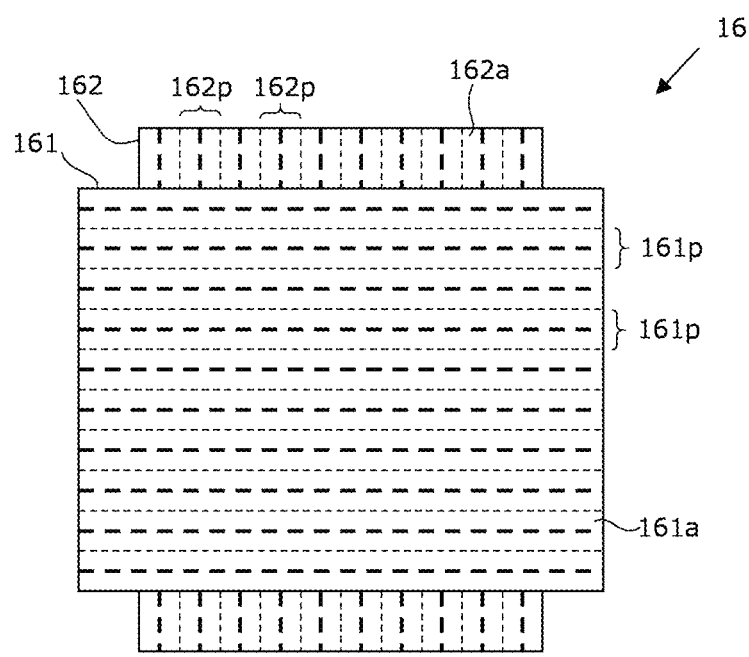
FIG. 4 is a schematic plan view schematically illustrating a division part provided in the light irradiation device of FIG. 3.

FIG. 4 is a schematic plan view schematically illustrating the division part 16.

FIG. 4 illustrates that the individual division parts intersect and are disposed overlappingly in a vertical direction (vertical direction on the paper of FIG. 1). Furthermore, in FIG. 4, thick broken lines indicate arrangement positions (arrangement) of tops in the below-mentioned irregularities and thin broken lines indicate arrangement positions (arrangement) of bottoms in the below-mentioned irregularities.

The first division part 161 divides the light L from the light emitter 15 into a plurality of first divided lights L11 (a first divided light L11a (see FIG. 5) and a first divided light L11b (see FIG. 5)) traveling in different directions. The first division part 161 emits the first divided light L11a and the first divided light L11b to the second division part 162. The first division part 161 has a rectangular shape in plan view. The first division part 161 includes a first surface 161a and a second surface 161b (see FIG. 5).

Figure 5:
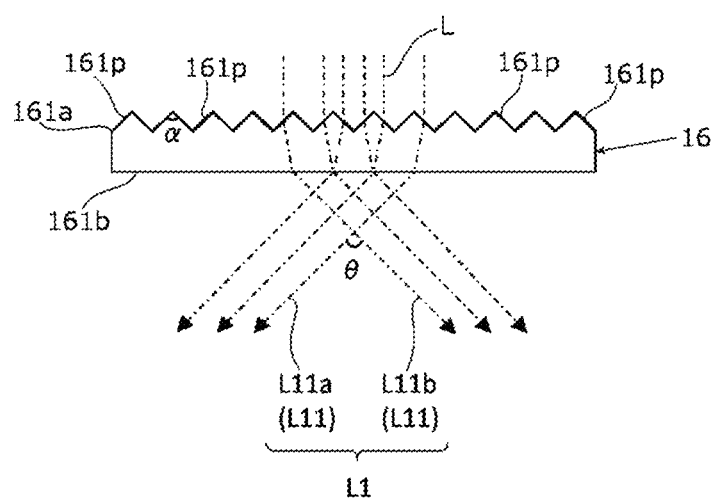
FIG. 5 is a schematic cross-sectional view of a first division part provided in the division part of FIG. 4, which schematically illustrates a state in which the first division part divides a light.

FIG. 5 is a schematic cross-sectional view of the first division part 161 and illustrates a state in which the first division part 161 divides the light L.

FIG. 5 illustrates a state in which the light L from the light emitter 15 passes through the first division part 161. In FIG. 5, the dashed lines indicate the traveling directions of the light L. For convenience of description, FIG. 5 illustrates the light L from the light emitter 15, which is incident on the first division part 161, as a parallel light.

The first surface 161a is a surface on which the light L from the light emitter 15 is incident. A plurality of convex parts 161p are arranged (disposed) in parallel on the first surface 161a. Each of the convex parts 161p includes, for example, a plurality of prisms having a triangular cross-section extending in one direction. Each of the convex parts 161p is arranged on the first surface 161a at a pitch of 50 μm, for example. The first surface 161a is an example of a first incident surface in the present invention. An irregularity including two adjacent convex parts 161p and a concave part between them is an example of an irregularity in the present invention. The first surface 161a including a plurality of irregularities constitutes a prism surface (irregularity surface). In the first division part 161, an arrangement direction of each of the irregularities is a first direction in the present invention. That is, the first direction is a horizontal direction on the paper in FIG. 4.

The second surface 161b is a surface that emits the light L incident on the first surface 161a toward the second division part 162. The second surface 161b is a surface opposite to the first surface 161a (back surface of the first surface 161a).

Figure 6:
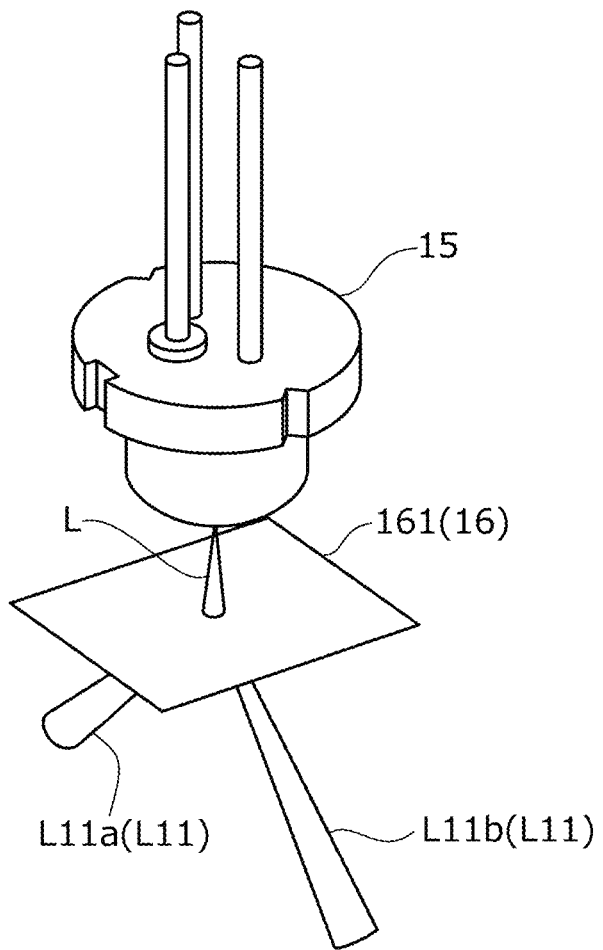
FIG. 6 is a schematic cross-sectional view of the first division part provided in the division part of FIG. 4, which schematically illustrates a state in which the first division part divides the light.

FIG. 6 is a schematic perspective view of the first division part 161 and illustrates a state in which the first division part 161 divides the light L.

FIG. 6 illustrates a state in which the light L from the light emitter 15 is divided into the two first divided lights L11 by the first division part 161. Illustrations of the convex parts 161p of the first division part 161 are omitted in FIG. 6.

When the light L from the light emitter 15 is incident on the first surface 161a, the light L incident on the first surface 161a is refracted by the prism surface and is divided into the two first divided lights L11 (the first divided light L11a and the first divided light L11b). Each of the first divided lights L11 is emitted from the second surface 161b (see FIG. 5) toward a first surface 162a of the second division part 162 (see FIG. 4).

Referring back to FIG. 5, an angle (bending angle of the divided light L1) θ formed between the emission direction of the first divided light L11a and the emission direction of the first divided light L11b increases as an angle (prism angle) α of the convex part 161p decreases. The angle θ formed between the emission direction of the first divided light L11a and the emission direction of the first divided light L11b does not change even if the incident position of the light L from the light emitter 15 on the prism surface of the first surface 161a is shifted. That is, for example, even if the light L from the light emitter 15 is incident from any part of the prism surface of the first surface 161a, the angle θ formed between the emission direction of the first divided light L11a and the emission direction of the first divided light L11b does not change.

The angle α of the convex part 161p is appropriately set by the relation between an interval (distance) between the first division part 161 and the second division part 162 and an incident angle of the first divided light L11a and the first divided light L11b on the second division part 162. In other words, the angle α of the convex part 161p is appropriately set by an arrangement position of the second division part 162 with respect to the first division part 161. That is, the angle α of the convex part 161p is set such that the angle θ formed between the emission direction of the first divided light L11a and the emission direction of the first divided light L11b becomes a desired angle.

Figure 7:
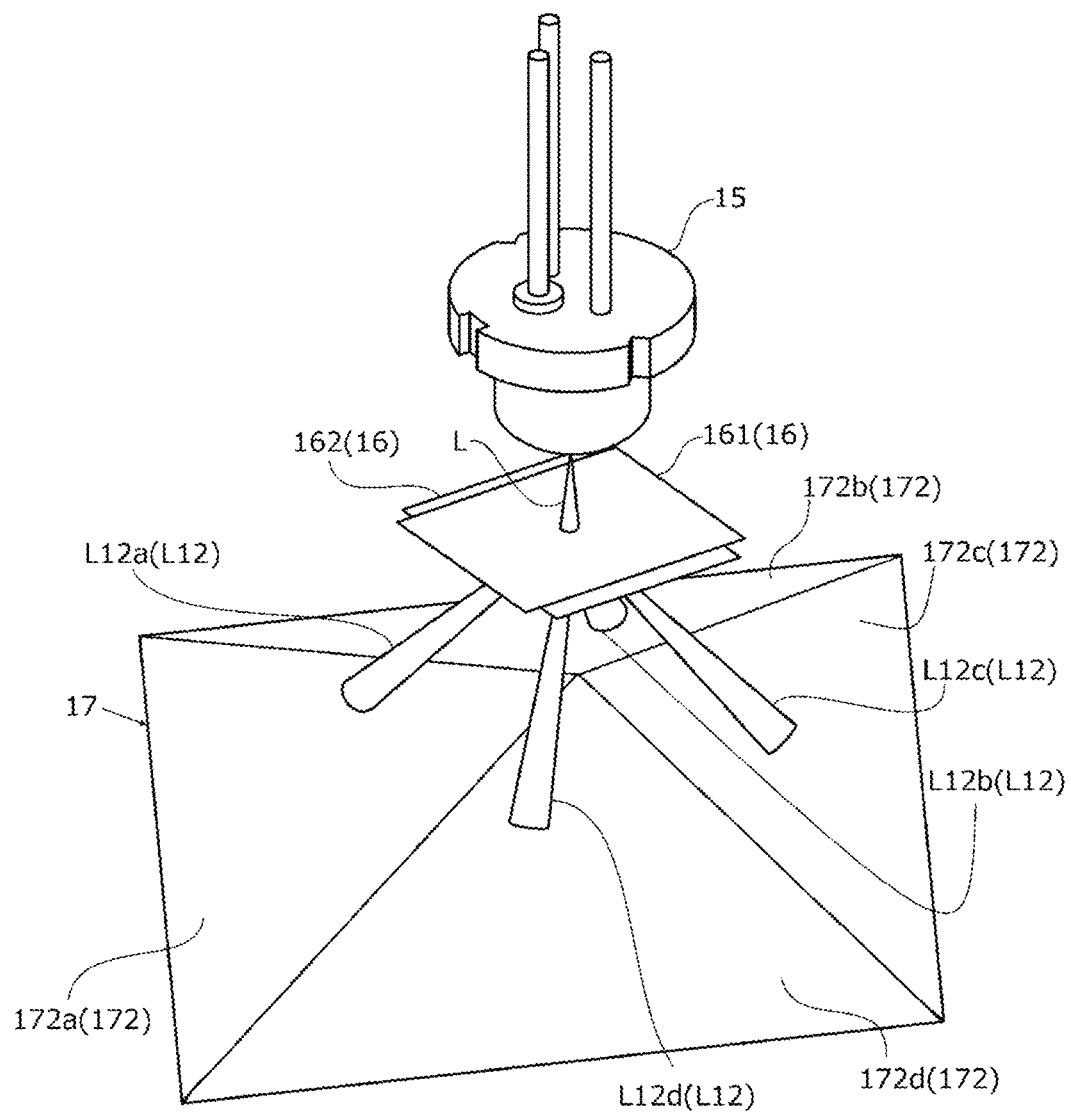
FIG. 7 is a perspective view illustrating a state in which lights divided by the division part of FIG. 4 are guided to a reflector included in the light irradiation device of FIG. 4.

FIG. 7 is a perspective view illustrating a state in which the light L from the light emitter 15 is divided by the first division part 161 and the second division part 162 and guided to the reflector 17.

Illustrations of the first divided lights L11 and the convex parts 161p and 162p are omitted in FIG. 7.

The second division part 162 divides each of the first divided light L11a (see FIG. 6) and the first divided light L11b (see FIG. 6) into two second divided lights L12 traveling in different directions. The second division part 162 emits the four second divided lights L12 to the reflector 17. That is, the second division part 162 divides the first divided light L11a into a second divided light L12a and a second divided light L12b, and divides the first divided light L11b into a second divided light L12c and a second divided light L12d. The second division part 162 emits the second divided light L12a, the second divided light L12b, the second divided light L12c, and the second divided light L12d to the reflector 17. As described above, the division part 16 divides the light L from the light emitter 15 into the four second divided lights L12 via the first division part 161 and the second division part 162.

Referring back to FIG. 4, the configuration of the second division part 162 is common to the configuration of the first division part 161. That is, the second division part 162 has a rectangular shape in plan view and includes a first surface 162a and a second surface (not illustrated). The first surface 162a is a surface on which the first divided lights L11 (the divided light L1 emitted from the second surface 161b of the first division part 161) are incident. A plurality of convex parts 162p are arranged in parallel on the first surface 162a. The first surface 162a is an example of a second incident surface in the present invention. An irregularity including two adjacent convex parts 162p and a concave part between them is an example of an irregularity in the present invention. The first surface 162a including a plurality of irregularities constitutes a prism surface. In the second division part 162, an arrangement direction of each of the irregularities is a second direction in the present invention. That is, the second direction is a vertical direction on the paper in FIG. 4.

The second division part 162 is disposed between the first division part 161 and the reflector 17, and is disposed with a gap from the first division part 161. That is, the second division part 162 is disposed below the first division part 161. Furthermore, the second direction is orthogonal to the first direction. That is, the second direction is different from the first direction.

The angle of the convex part 162p is appropriately set by the relation between an interval (distance) between the second division part 162 and the reflector 17 and an incident angle of the four second divided lights L12 on the below-mentioned reflection surface 172 of the reflector 17. In other words, the angle of the convex part 162p is appropriately set by an arrangement position of the reflector 17 with respect to the second division part 162. That is, the angle of the convex part 162p is set such that an angle formed between the emission direction of the second divided light L12a and the emission direction of the second divided light L12b and an angle formed between the emission direction of the second divided light L12c and the emission direction of the second divided light L12d become a desired angle, respectively.

Referring back to FIG. 3 and FIG. 7, the reflector 17 reflects a part of the divided lights L1 from the division part 16, and transmits the remaining part of the divided lights L1 from the division part 16. The divided lights L1 subjected to reflection and transmission (hereinafter, referred to as "reflection and the like") by the reflector 17 are guided to the radiation case 12. The reflector 17 has a quadrangular pyramid shape. Four surfaces, except for the bottom surface of the reflector 17, allow the second divided lights L12 (the second divided light L12a, the second divided light L12b, the second divided light L12c, and the second divided light L12d) divided by the second division part 162 to be subjected to reflection and the like. The reflector 17 is disposed below the division part 16 with a predetermined interval from the division part 16, and is supported by the support part (not illustrated) in the radiation case 12. Since the reflector 17 is disposed with the predetermined interval from the division part 16, the second divided lights L12 divided by the second division part 162 are not incident on the power receiving terminal 19 (are not blocked by the power receiving terminal 19) when transmitted through the reflector 17.

The reflector 17 includes a pedestal part 171 and the reflection surface 172. The reflector 17 is configured with a reflection film deposited on a part of the surface of the pedestal part 171.

The pedestal part 171 transmits each of the second divided lights L12 transmitted through the reflection surface 172. Each of the second divided lights L12 transmitted through the reflection surface 172 is transmitted while being refracted in the pedestal part 171. The pedestal part 171 has a quadrangular pyramid shape, and is made of, for example, a synthetic resin having a transmitting property such as polycarbonate.

The reflection surface 172 is a surface of the reflector 17, reflects a part of the second divided lights L12, and transmits the remaining part of the second divided lights L12. The reflection surface 172 is, for example, a half mirror (one-way mirror). The reflection surface 172 is configured with the surface of the pedestal part 171 on which a deposition process of a semi-transmissive film (light semi-transmissive film) is provided. The transmittance of the semi-transmissive film is, for example, 20%. The semi-transmissive film is deposited on four surfaces, except for the bottom surface of the pedestal part 171. The material of the semi-transmissive film is, for example, a metal such as aluminum, silver, and nickel. That is, the reflector 17 reflects 80% of the second divided light L12 incident on the semi-transmissive film and transmits 20% of the second divided light L12 incident on the semi-transmissive film.

It should be noted that the transmittance of the reflector (semi-transmissive film) is not limited to 20% (reflectance is not limited to 80%). That is, for example, the transmittance and reflectance of the reflector may be arbitrary as long as the reflector can allow a plurality of divided lights from the division part to be uniformly subjected to the reflection and the like.

Four surfaces, except for the bottom surface of the reflection surface 172, function as individual reflection surfaces (an individual reflection surface 172a, an individual reflection surface 172b, an individual reflection surface 172c, and an individual reflection surface 172d) corresponding to the second divided lights L12, respectively. That is, the reflector 17 reflects, with each of the individual reflection surfaces 172a to 172d, a part of the corresponding second divided light L12a, L12b, L12c, or L12d to be guided toward the cylindrical part 121, and transmits a part of the corresponding second divided light L12a, L12b, L12c, or L12d to be guided to the bottom part 122.

It should be noted that the material of the pedestal part is not limited to a synthetic resin such as polycarbonate as long as the pedestal part can transmit a part of the second divided light. That is, for example, it is sufficient if the material of the pedestal part is a translucent member.

Furthermore, it is sufficient if the pedestal part can transmit a part of the second divided light on each of the reflection surfaces to be guided to the bottom part of the radiation case, and the shape of the pedestal part may be a bottomed pedestal part or a bottomless pedestal part.

Moreover, it is sufficient if the pedestal part can transmit a part of the second divided light, and the configuration of the pedestal part may be a solid shape or a configuration having a uniform thickness along the reflection surface.

Moreover, the reflection surface is not limited to a half mirror as long as the reflection surface can reflect a part of the second divided light and transmit a part thereof. That is, for example, the configuration of the reflection surface may be a dimming mirror that adjusts reflection and transmission with an applied voltage, a diffusion mirror, or a configuration that transfers a metal film to the pedestal part.

Referring back to FIG. 2, the controller 18 controls the operation of the entire microphone 1. The controller 18 includes, for example, a processor such as a central processing unit (CPU) and a micro processing unit (MPU), an integrated circuit such as an application specific integrated circuit (ASIC) and a field programmable gate array (FPGA), and a semiconductor memory element such as a read only memory (ROM) and a random access memory (RAM). The controller 18 is mounted on the circuit board 21.

The power receiving terminal 19 accepts (receives) power to the power storage 20 (power to be stored in the power storage 20) from a charger (not illustrated). The size of the power receiving terminal 19 is smaller than a bottom area of the reflector 17. As will be described later, the power receiving terminal 19 is disposed at a position, where the lights L (the second divided lights L12a to L12d) transmitted through the reflector 17 are not incident, below the reflector 17 in the radiation case 12. That is, the power receiving terminal 19 is disposed on an opposite side of the light emitter 15 with respect to the reflector 17 (see FIG. 3). A part of the power receiving terminal 19 is exposed from the bottom part 122 to the outside of the radiation case 12 (outside of the microphone 1).

The power storage 20 stores (charges) the power from the power receiving terminal 19 and supplies the power to the light emitter 15 and the controller 18 via the circuit board 21. That is, the power storage 20 stores the power to be supplied to the light emitter 15 and the controller 18. The power storage 20 is, for example, a rechargeable battery such as a nickel-hydrogen rechargeable battery.

The circuit board 21 mounts the modulator 14 and the controller 18, for example. The circuit board 21 is connected to the power storage 20 and receives the supply of the power from the power storage 20.

As described above, the light emitter 15, the division part 16, and the reflector 17 constitute the light irradiation device 1y. That is, the microphone 1 includes the light irradiation device 1y. The light irradiation device 1y generates and emits (outputs) a light (infrared signal) corresponding to the sound signal from the driver unit 13.

Operation of Wireless Microphone (1)

The operation of the microphone 1 will now be described with reference to FIG. 2, FIG. 6, and FIG. 7.

Firstly, the light emitter 15 generates and emits (outputs) the light L corresponding to the sound signal from the driver unit 13, which is received via the modulator 14.

Then, the light L from the light emitter 15 is incident on the first surface 161a (first incident surface) of the first division part 161. The light L from the light emitter 15 is refracted by the prism surface of the first division part 161 when passing through the first division part 161, and is divided into the first divided light L11a and the first divided light L11b. The first divided light L11a and the first divided light L11b are emitted from the second surface 161b and incident on the first surface 162a (second incident surface) of the second division part 162.

The first divided light L11a is refracted by the prism surface of the second division part 162 when passing through the second division part 162, and is divided into the second divided light L12a and the second divided light L12b. The second divided light L12a is emitted (guided) toward the individual reflection surface 172a from the second surface (not illustrated), and the second divided light L12b is emitted (guided) toward the individual reflection surface 172b from the second surface (not illustrated).

Similarly, the first divided light L11b is refracted by the prism surface of the second division part 162 when passing through the second division part 162, and is divided into the second divided light L12c and the second divided light L12d. The second divided light L12c is emitted toward the individual reflection surface 172c from the second surface (not illustrated), and the second divided light L12d is emitted toward the individual reflection surface 172d from the second surface (not illustrated).

Then, the second divided light L12a emitted from the second division part 162 is incident on the individual reflection surface 172a. A part of the second divided light L12a incident on the individual reflection surface 172a is reflected in a first optical axis direction D1 (see FIG. 8). The second divided light L12a reflected by the individual reflection surface 172a is diffused by the diffuser (not illustrated) of the radiation case 12 and radiated to the outside of the microphone 1 from the cylindrical part 121. The first optical axis direction D1 is a direction in which the second divided light L12a reflected by the individual reflection surface 172a is guided. On the other hand, the remaining part of the second divided light L12a incident on the individual reflection surface 172a is transmitted while being refracted in the reflector 17. The second divided light L12a transmitted through the reflector 17 passes through a side of the power receiving terminal 19, and is radiated to the outside of the microphone 1 from the bottom part 122 of the radiation case 12.

Similarly, the second divided light L12b emitted from the second division part 162 is incident on the individual reflection surface 172b. A part of the second divided light L12b incident on the individual reflection surface 172b is reflected in a second optical axis direction D2 (see FIG. 8). The second divided light L12b reflected by the individual reflection surface 172b is diffused by the diffuser of the radiation case 12 and radiated to the outside of the microphone 1 from the cylindrical part 121. The second optical axis direction D2 is a direction in which the second divided light L12b reflected by the individual reflection surface 172b is guided. On the other hand, the remaining part of the second divided light L12b incident on the individual reflection surface 172b is transmitted while being refracted in the reflector 17. The second divided light L12b transmitted through the reflector 17 passes through a side of the power receiving terminal 19, and is radiated to the outside of the microphone 1 from the bottom part 122 of the radiation case 12.

Similarly, the second divided light L12c emitted from the second division part 162 is incident on the individual reflection surface 172c. A part of the second divided light L12c incident on the individual reflection surface 172c is reflected in a third optical axis direction D3 (see FIG. 8). The second divided light L12c reflected by the individual reflection surface 172c is diffused by the diffuser of the radiation case 12 and radiated to the outside of the microphone 1 from the cylindrical part 121. The third optical axis direction D3 is a direction in which the second divided light L12c reflected by the individual reflection surface 172c is guided. On the other hand, the remaining part of the second divided light L12c incident on the individual reflection surface 172c is transmitted while being refracted in the reflector 17. The second divided light L12c transmitted through the reflector 17 passes through a side of the power receiving terminal 19, and is radiated to the outside of the microphone 1 from the bottom part 122 of the radiation case 12.

Similarly, the second divided light L12d emitted from the second division part 162 is incident on the individual reflection surface 172d. A part of the second divided light L12d incident on the individual reflection surface 172d is reflected in a fourth optical axis direction D4 (see FIG. 8). The second divided light L12d reflected by the individual reflection surface 172d is diffused by the diffuser of the radiation case 12 and radiated to the outside of the microphone 1 from the cylindrical part 121. The fourth optical axis direction D4 is a direction in which the second divided light L12d reflected by the individual reflection surface 172d is guided. On the other hand, the remaining part of the second divided light L12d incident on the individual reflection surface 172d is transmitted while being refracted in the reflector 17. The second divided light L12d transmitted through the reflector 17 passes through a side of the power receiving terminal 19, and is radiated to the outside of the microphone 1 from the bottom part 122 of the radiation case 12.

As described above, each of the second divided lights L12a to L12d reflected by the reflector 17 (the individual reflection surfaces 172a to 172d) and each of the second divided lights L12a to L12d transmitted through the reflector 17 (the pedestal part 171) are guided in different directions.

Figure 8:
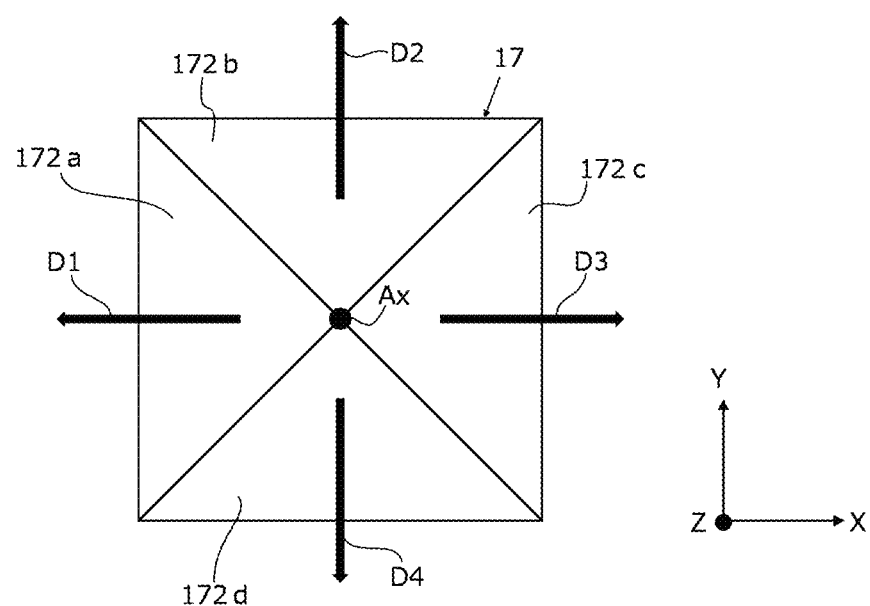
FIG. 8 is a schematic plan view schematically illustrating the optical axis directions of lights reflected by the reflector of FIG. 7.

FIG. 8 is a schematic plan view schematically illustrating the optical axis directions of the lights reflected by the reflector 17. In FIG. 8, arrows indicated with thick lines indicate the first optical axis direction D1, the second optical axis direction D2, the third optical axis direction D3, and the fourth optical axis direction D4 when viewed in the axial direction of the optical axis Ax.

As will be described later, an angle formed between the first optical axis direction D1 and the second optical axis direction D2 is about 90° when viewed in the axial direction of the optical axis Ax. Similarly, an angle formed between the first optical axis direction D1 and the fourth optical axis direction D4 is about 90° when viewed in the axial direction of the optical axis Ax. An angle formed between the second optical axis direction D2 and the third optical axis direction D3 is about 90° when viewed in the axial direction of the optical axis Ax. An angle formed between the third optical axis direction D3 and the fourth optical axis direction D4 is about 90° when viewed in the axial direction of the optical axis Ax. That is, the angle formed between the first optical axis direction D1 and the second optical axis direction D2 is equal to each of the angle formed between the first optical axis direction D1 and the fourth optical axis direction D4, the angle formed between the second optical axis direction D2 and the third optical axis direction D3, and the angle formed between the third optical axis direction D3 and the fourth optical axis direction D4.

Effects of Wireless Microphone (1)

Effects of the microphone 1 will now be described.

Figure 9:
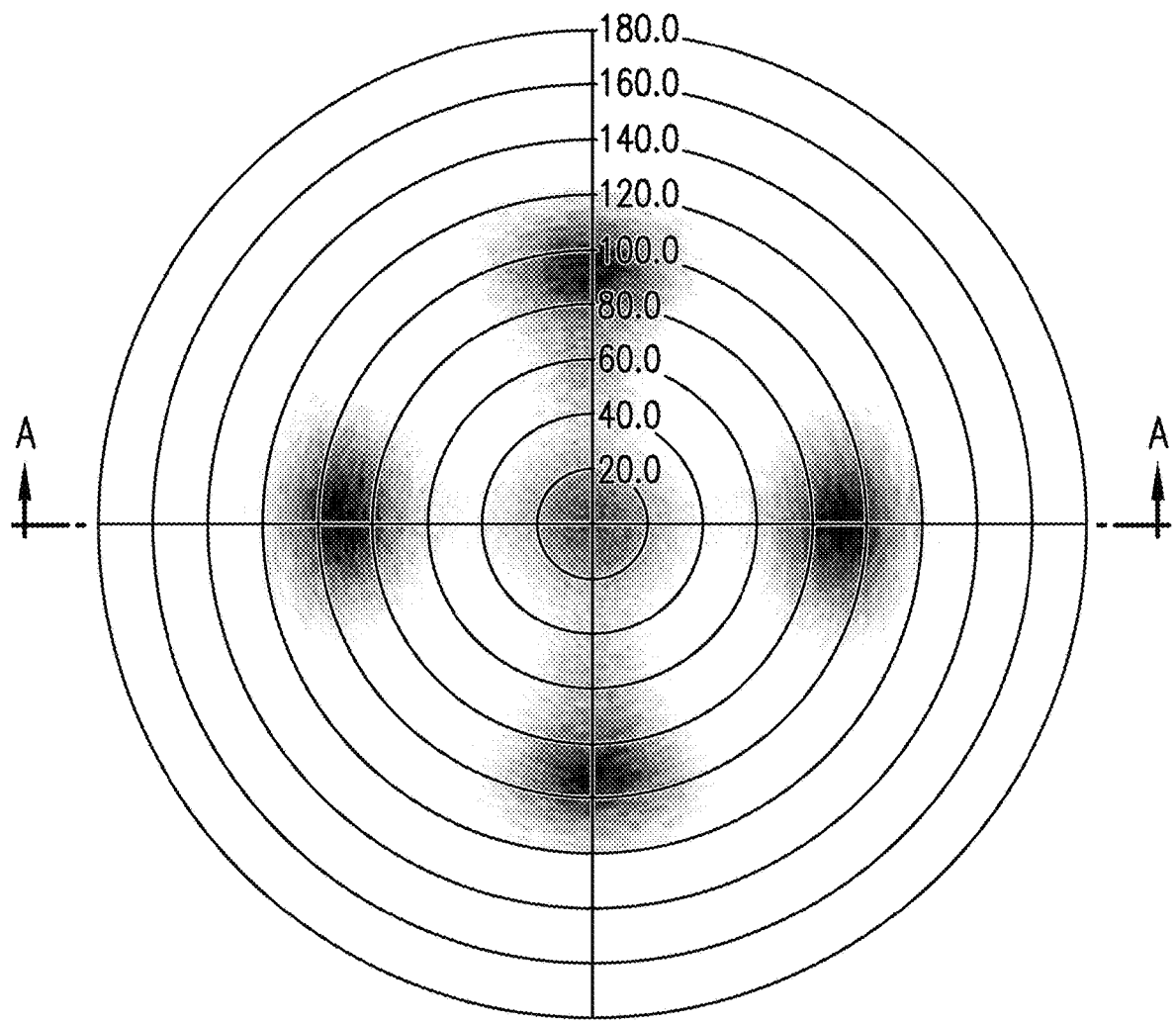
FIG. 9 is a view illustrating a distribution of the radiation intensity of lights reflected by the reflector and the radiation intensity of lights transmitted through the reflector in a virtual circle obtained with a virtual sphere expanded from a position of 180° with respect to 0°, which employs an optical axis direction of a light from a light emitter included in the light irradiation device of FIG. 3 as a center axis.

FIG. 9 is a view illustrating a distribution of the radiation intensity of the second divided lights L12 in a virtual circle obtained with a virtual sphere expanded from a position of 180° with respect to 0°, which employs the direction (0° to 180°) of the optical axis Ax as a center axis.

In FIG. 9, dark parts indicate parts with a high radiation intensity.

In the following description, the position (mounting position) of each constituent member of the light irradiation device 1y, in which the distribution of the radiation intensity of the second divided lights L12 is as illustrated in FIG. 9, is a reference position. The reference position is a predetermined arrangement position of the light emitter 15, the division part 16, and the reflector 17, each of which is the constituent member of the light irradiation device 1y.

Of the second divided light L12a, the second divided light L12a reflected by the individual reflection surface 172a has a distribution of the radiation intensity in a range of about 80° to about 100°. In particular, the radiation intensity of the second divided light L12a reflected by the individual reflection surface 172a is high near 90°. That is, an angle (hereinafter, referred to as a "first angle") formed between the direction of the optical axis Ax and the first optical axis direction D1 is "approximately 90°".

Of the second divided light L12b, the second divided light L12b reflected by the individual reflection surface 172b has a distribution of the radiation intensity in a range of about 80° to about 100°. In particular, the radiation intensity of the second divided light L12b reflected by the individual reflection surface 172b is high near 90°. That is, an angle (hereinafter, referred to as a "second angle") formed between the direction of the optical axis Ax and the second optical axis direction D2 is "approximately 90°".

Of the second divided light L12c, the second divided light L12c reflected by the individual reflection surface 172c has a distribution of the radiation intensity in a range of about 80° to about 100°. In particular, the radiation intensity of the second divided light L12c reflected by the individual reflection surface 172c is high near 90°. That is, an angle (hereinafter, referred to as a "third angle") formed between the direction of the optical axis Ax and the third optical axis direction D3 is "approximately 90°".

Of the second divided light L12d, the second divided light L12d reflected by the individual reflection surface 172d has a distribution of the radiation intensity in a range of about 80° to about 100°. In particular, the radiation intensity of the second divided light L12d reflected by the individual reflection surface 172d is high near 90°. That is, an angle (hereinafter, referred to as a "fourth angle") formed between the direction of the optical axis Ax and the fourth optical axis direction D4 is "approximately 90°".

Among the second divided lights L12a to L12d, the second divided lights L12 (see FIG. 3) transmitted through the reflector 17 without being reflected by the reflector 17 and radiated to the outside of the microphone 1 from the bottom part 122 of the radiation case 12 have a distribution of the radiation intensity in a range of about 0° to about 20°. In particular, the radiation intensity of the second divided lights L12 transmitted through the reflector 17 is high near 0°.

As described above, the first angle, the second angle, the third angle, and the fourth angle are all equal to "approximately 90°". That is, each of the second divided lights L12 reflected by each of the individual reflection surfaces 172a to 172d is output in a direction orthogonal to the optical axis Ax.

Furthermore, in the second divided lights L12a to L12d, the second divided light L12a reflected by the individual reflection surface 172a, the second divided light L12b reflected by the individual reflection surface 172b, the second divided light L12c reflected by the individual reflection surface 172c, and the second divided light L12d reflected by the individual reflection surface 172d are approximately uniformly radiated in a circumferential direction of the optical axis Ax. That is, as described above, the angle formed between the first optical axis direction D1 and the second optical axis direction D2 is equal to each of the angle formed between the first optical axis direction D1 and the fourth optical axis direction D4, the angle formed between the second optical axis direction D2 and the third optical axis direction D3, and the angle formed between the third optical axis direction D3 and the fourth optical axis direction D4 at "approximately 90°".

Moreover, each of the second divided lights L12a to L12d transmitted through the reflector 17 without being reflected by the reflector 17 and radiated from the bottom part 122 of the radiation case 12 is radiated in a direction (the direction of the optical axis Ax) of about 0° with respect to the optical axis Ax.

Figure 10:
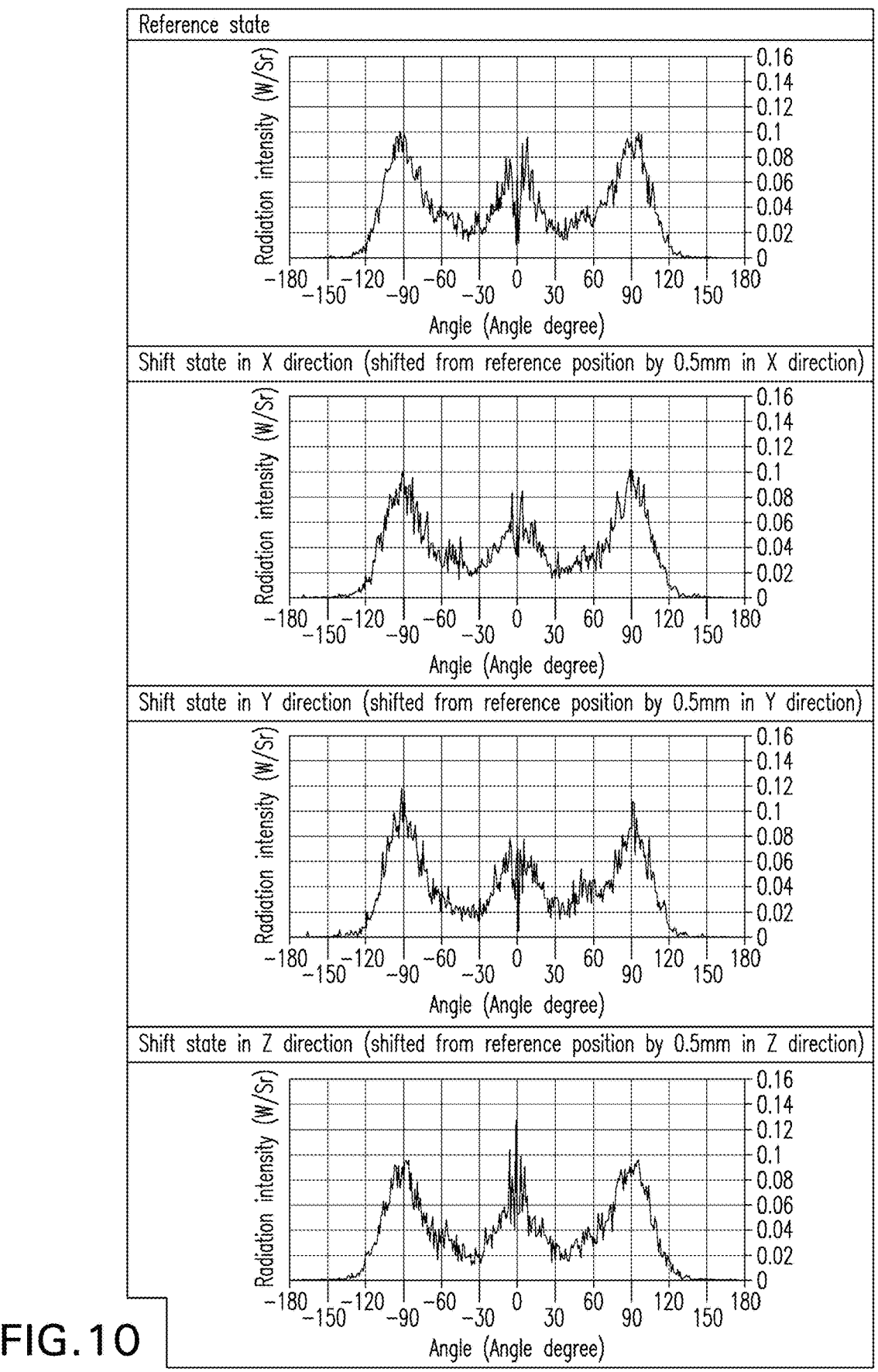
FIG. 10 is a graph illustrating a relation between angles of the lights reflected by the reflector of FIG. 7 and the lights transmitted through the reflector with respect to the optical axis and the radiation intensity.

FIG. 10 is a graph illustrating a relation between angles of the second divided lights L12 reflected by the reflector 17 and the second divided lights L12 transmitted through the reflector 17 (hereinafter, referred to as "second divided lights L12 subjected to reflection and the like in the reflector 17") with respect to the optical axis Ax and the radiation intensity. In FIG. 10, a vertical axis denotes the radiation intensity and a horizontal axis denotes the angle.

FIG. 10 illustrates a relation between the angles of the second divided lights L12 subjected to reflection and the like in the reflector 17 with respect to the optical axis Ax and the radiation intensity in a reference state, a shift state in the X direction, a shift state in the Y direction, and a shift state in the Z direction. The "reference state" is a state in which each constituent member of the light irradiation device 1y is disposed at the reference position. The "shift state in the X direction" is a state in which the light emitter 15 is shifted from the reference position by 0.5 mm in the X direction (see FIG. 8). The "shift state in the Y direction" is a state in which the light emitter 15 is shifted from the reference position by 0.5 mm in the Y direction (see FIG. 8). The "shift state in the Z direction" is a state in which the light emitter 15 is shifted from the reference position by 0.5 mm in the Z direction (see FIG. 8).

The radiation intensity in the reference state illustrated in FIG. 10 is an intensity distribution at respective angles of the second divided lights L12 subjected to reflection and the like in the reflector 17 with respect to the optical axis Ax at the position of line A-A of FIG. 9. The radiation intensity at a position near 0° is an intensity distribution of the second divided lights L12 transmitted through the reflector 17 with respect to the optical axis Ax (the same in any state). The radiation intensity at a position near 90° is an intensity distribution of the second divided lights L12 reflected by the reflector 17 with respect to the optical axis Ax (the same in any state).

The radiation intensity in the reference state has peaks near 0° and near 90°. Similarly, the radiation intensity in the shift state in the X direction has peaks near 0° and near 90°. The radiation intensity in the shift state in the Y direction has peaks near 0° and near 90°. The radiation intensity in the shift state in the Z direction has peaks near 0° and near 90°. That is, the shift state in the X direction, the shift state in the Y direction, and the shift state in the Z direction have the same radiation intensity distribution as the reference state.

As described above, even if the arrangement position of the light emitter 15 in the microphone 1 is shifted in any of the X direction, the Y direction, and the Z direction, no large difference in the relation between the angles of the second divided lights L12, which are subjected to reflection and the like in the reflector 17, with respect to the optical axis Ax and the radiation intensity occurs. That is, the relation between the angles of the second divided lights L12 subjected to reflection and the like in the reflector 17 with respect to the optical axis Ax and the radiation intensity is hardly affected by an assembly error of the sound signal transmitter 1x (the light irradiation device 1y) (effect is small). Therefore, when the microphone 1 (the sound signal transmitter 1x) is assembled, the light emitter 15 may not be strictly disposed with the reflector 17 such that the center axis (apex) of the reflector 17 is located on the optical axis of the light L from the light emitter 15. As a result, the microphone 1 (the sound signal transmitter 1x) is easily assembled. Furthermore, the arrangement position of the light emitter 15, the division part 16, and the reflector 17 may be shifted due to an impact of a drop at the time of use after the microphone 1 (the sound signal transmitter 1x) is assembled. However, as compared to a state before the arrangement position is shifted, no large difference in the relation between the angles of the second divided lights L12, which are subjected to reflection and the like in the reflector 17 in the microphone 1, with respect to the optical axis Ax and the radiation intensity occurs.

Figure 11:
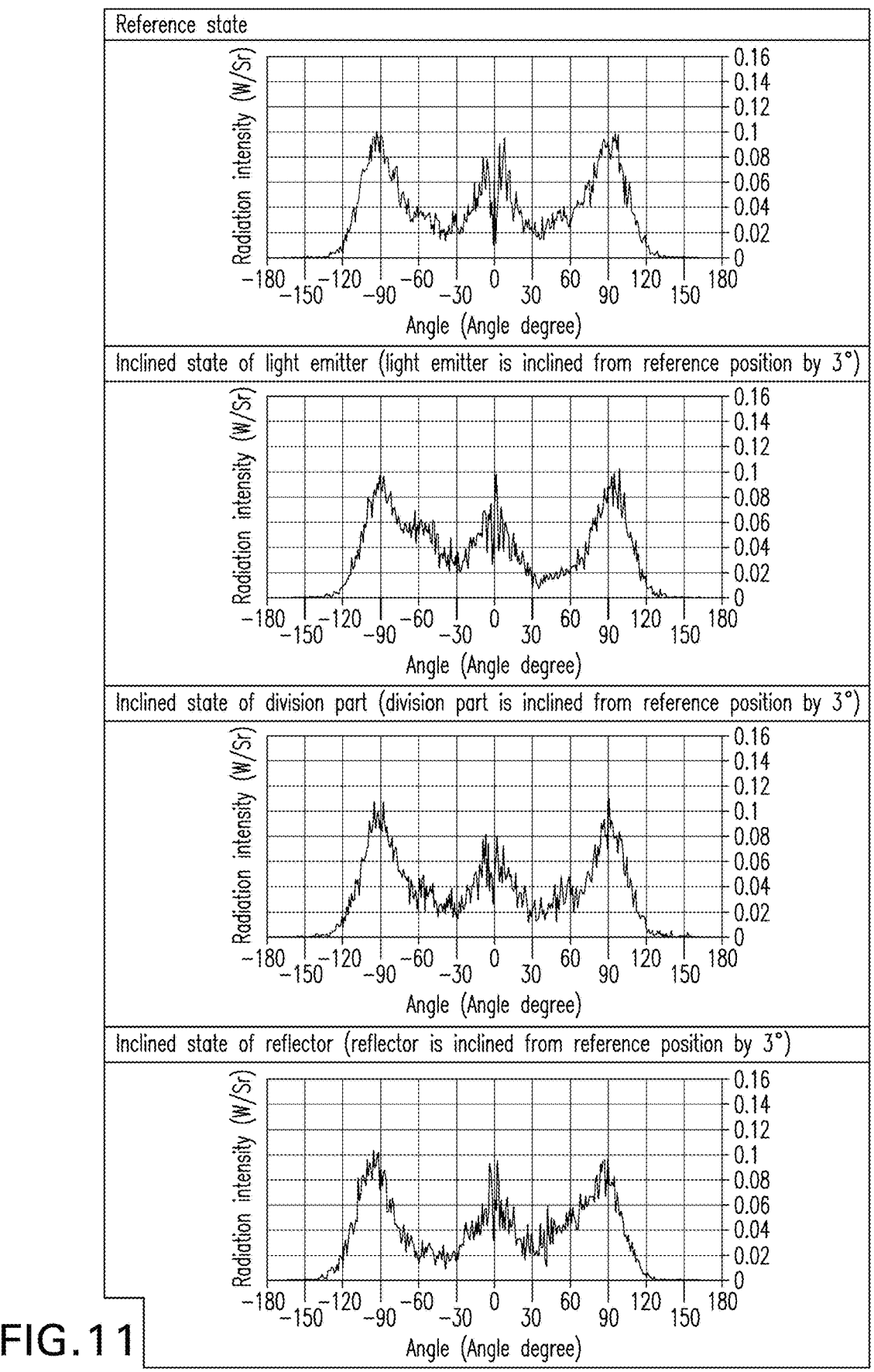
FIG. 11 is a graph illustrating another relation between the angles of the lights reflected by the reflector of FIG. 7 and the lights transmitted through the reflector with respect to the optical axis and the radiation intensity.

FIG. 11 is a graph illustrating another relation between the angles of the second divided lights L12 subjected to reflection and the like in the reflector 17 with respect to the optical axis Ax and the radiation intensity. In FIG. 11, a vertical axis denotes the radiation intensity and a horizontal axis denotes the angle distribution.

FIG. 11 illustrates the radiation intensity of the second divided lights L12 subjected to reflection and the like in the reflector 17 in the reference state, an inclined state of the light emitter 15, an inclined state of the division part 16, and an inclined state of the reflector 17. The "inclined state of the light emitter 15" is a state in which the light emitter 15 is inclined from the reference position by 3° with respect to the X axis (see FIG. 8). The "inclined state of the division part 16" is a state in which the division part 16 is inclined from the reference position by 3° with respect to the X axis. The "inclined state of the reflector 17" is a state in which the reflector 17 is inclined from the reference position by 3° with the X direction as an axis.

The radiation intensity in the reference state has peaks near 0° and near 90° as described above. Similarly, the radiation intensity in the inclined state of the light emitter 15 has peaks near 0° and near 90°. The radiation intensity in the inclined state of the division part 16 has peaks near 0° and near 90°. The radiation intensity in the inclined state of the reflector 17 has peaks near 0° and near 90°. That is, the inclined state of the light emitter 15, the inclined state of the division part 16, and the inclined state of the reflector 17 have the same relation between the angle and the radiation intensity as the reference state.

As described above, even if any of the light emitter 15, the division part 16, and the reflector 17 is disposed to be inclined in the microphone 1, no large difference in the relation between the angles of the second divided lights L12, which are subjected to reflection and the like in the reflector 17, with respect to the optical axis Ax and the radiation intensity occurs. That is, the relation between the angles of the second divided lights L12 subjected to reflection and the like in the reflector 17 with respect to the optical axis Ax and the radiation intensity is hardly affected by the assembly error of the light irradiation device 1y constituting the sound signal transmitter 1x (effect is small). Therefore, when the light irradiation device is assembled, the light emitter 15, the division part 16, and the reflector 17 may not be strictly disposed. As a result, the microphone 1 is easily assembled. Furthermore, the arrangement position of the light emitter 15, the division part 16, and the reflector 17 may be shifted due to an impact of a drop at the time of use after the microphone 1 is assembled. However, as compared to a state before the arrangement position is shifted, no large difference in the relation between the angles of the second divided lights L12, which are subjected to reflection and the like in the reflector 17 in the microphone 1, with respect to the optical axis Ax and the radiation intensity occurs.

Conclusion (1)

According to the embodiment described above, the division part 16 divides the light L from the light emitter 15 (one laser diode) into the four second divided lights L12 (the second divided lights L12a to L12d) with the first division part 161 and the second division part 162. The four second divided lights L12a to L12d are incident on the reflector 17, are subjected to reflection and the like by the corresponding individual reflection surfaces 172a to 172d, and are radiated to the outside of the microphone 1. That is, the sound signal transmitter 1x constituting the microphone 1 uniformly outputs the light from the light emitter 15 in the circumferential direction of the sound signal transmitter 1x, regardless of the light emitter 15 including one laser diode. That is, the microphone 1 according to the present embodiment uniformly outputs the light from the light emitter 15 in the circumferential direction of the sound signal transmitter 1x, regardless of the orientation of the microphone 1. As a result, the microphone 1 according to the present embodiment implements stable communication with a light receiver.

Furthermore, the arrangement position of each constituent member of the microphone 1 is set such that each of the second divided lights L12a to L12d transmitted through the reflector 17 without being reflected by the reflector 17 is radiated below the microphone 1 from the bottom part 122 of the radiation case 12 without being blocked by the power receiving terminal 19. As a result, the microphone 1 according to the present embodiment also outputs the light from below the microphone 1.

Moreover, according to the embodiment described above, the first angle, the second angle, the third angle, and the fourth angle are all "approximately 90°". That is, among the second divided lights L12a to L12d, each of the second divided lights L12 reflected by the individual reflection surfaces 172a to 172d is output in a direction orthogonal to the circumferential direction with respect to the optical axis Ax. That is, the microphone 1 according to the present embodiment uniformly outputs the light from the light emitter 15 in the circumferential direction of the sound signal transmitter 1x. As a result, the microphone 1 according to the present embodiment implements stable communication with the light receiver.

Moreover, according to the embodiment described above, the second divided light L12a reflected by the individual reflection surface 172a, the second divided light L12b reflected by the individual reflection surface 172b, the second divided light L12c reflected by the individual reflection surface 172c, and the second divided light L12d reflected by the individual reflection surface 172d are approximately uniformly radiated in the circumferential direction of the optical axis Ax. That is, in the microphone 1, regardless of the orientation of the microphone 1, each of the angles formed by the optical axis directions D1 to D4 of the second divided lights L12 reflected by the respective individual reflection surfaces 172a to 172d is "approximately 90°". That is, the microphone 1 according to the present embodiment uniformly outputs the light from the light emitter 15 in the circumferential direction of the sound signal transmitter 1x. As a result, the microphone 1 according to the present embodiment implements stable communication with the light receiver.

Moreover, the reflector 17 has a quadrangular pyramid shape. Therefore, even if the incident position of the second divided light on the individual reflection surface is shifted (even if the second divided light is incident to any position of the individual reflection surface), the optical axis direction of each of the second divided lights L12 reflected by the respective individual reflection surfaces 172a to 172d does not change as long as an incident angle to each of the individual reflection surfaces 172a to 172d is constant. That is, the microphone 1 according to the present embodiment uniformly outputs the light from the light emitter 15 in the circumferential direction of the sound signal transmitter 1x, regardless of the orientation of the microphone 1. As a result, the microphone 1 according to the present embodiment implements stable communication with the light receiver.

Moreover, according to the embodiment described above, even if the arrangement position of the light emitter 15 in the microphone 1 is shifted in any of the X direction, the Y direction, and the Z direction, no large difference in the relation between the angles of the second divided lights L12, which are subjected to reflection and the like in the reflector 17, with respect to the optical axis Ax and the radiation intensity occurs. Furthermore, even if any of the light emitter 15, the division part 16, and the reflector 17 is disposed to be inclined in the microphone 1, no large difference in the relation between the angles of the second divided lights L12, which are subjected to reflection and the like in the reflector 17, with respect to the optical axis Ax and the radiation intensity occurs. That is, the relation between the angles of the second divided lights L12 subjected to reflection and the like in the reflector 17 with respect to the optical axis Ax and the radiation intensity is hardly affected by the assembly error of the light irradiation device 1y constituting the sound signal transmitter 1x. Specifically, as compared to the transmitter according to the related art (hereinafter, referred to as a "conventional transmitter") that requires accurate position accuracy between a laser diode (light emitter) and a reflector, in the sound signal transmitter 1x constituting the microphone 1 according to the present embodiment, the influence of the assembly error of the sound signal transmitter 1x on the relation between the angles of the second divided lights L12 subjected to reflection and the like in the reflector 17 with respect to the optical axis Ax and the radiation intensity is small. Therefore, when the sound signal transmitter 1x is assembled, the light emitter 15 may not be strictly disposed with the reflector 17 such that the center axis (apex) of the reflector 17 is located on the optical axis of the light L from the light emitter 15. As a result, as compared to the conventional transmitter, the microphone 1 is easily assembled. Moreover, the arrangement position of the light emitter 15, the division part 16, and the reflector 17 may be shifted due to an impact of a drop at the time of use after the microphone 1 is assembled. However, as compared to a state before the arrangement position is shifted, no large difference in the relation between the angles of the second divided lights L12, which are subjected to reflection and the like in the reflector 17 in the microphone 1, with respect to the optical axis Ax and the radiation intensity occurs. That is, the microphone 1 according to the present embodiment uniformly outputs the light L from the light emitter 15 in the circumferential direction of the sound signal transmitter 1x even if a shift or inclination occurs in the constituent member of the light irradiation device 1y constituting the sound signal transmitter 1x.

It should be noted that the first direction and the second direction may not be orthogonal to each other. That is, for example, it is sufficient if the first direction and the second direction are not the same direction but are different directions.

Furthermore, the shape of the first division part is not limited to the rectangular shape as long as the first division part can divide the light from the light emitter into a plurality of first divided lights and guide the first divided lights to the second division part. That is, for example, the shape of the first division part may be a square, a circle, or other shapes.

Moreover, the shape of the second division part is not limited to the rectangular shape as long as the second division part can divide each of the first divided lights into a plurality of second divided lights and guide the second divided lights to the reflector. That is, for example, the shape of the second division part may be a square, a circle, or other shapes.

Moreover, the shape of the reflector may not be a pyramid shape having an apex as long as the reflector includes a surface on which the second divided lights divided by the division part are incident. That is, for example, the shape of the reflector may be a truncated pyramid shape.

Moreover, the shape of the reflector may not be a quadrangular pyramid shape as long as the reflector can allow the second divided lights divided by and incident from the division part to be subjected to reflection and the like. That is, for example, the shape of the reflector may be a conical shape or a truncated conical shape.

Moreover, the diffuser of the radiation case may be disposed on an inner surface of the bottom part. That is, for example, the diffuser may be disposed on an inner peripheral surface of the cylindrical part of the radiation case and the inner surface of the bottom part of the radiation case, so that all of the second divided lights subjected to reflection and the like in the reflector may be diffused and radiated to the outside of the microphone.

Wireless Microphone (2)

Another embodiment of the wireless microphone according to the present invention will now be described focusing on differences with the aforementioned embodiment (hereinafter, referred to as a "first embodiment"). In the present embodiment (hereinafter, referred to as a "second embodiment"), the configuration of the division part and the configuration of the reflector are different from those of the first embodiment.

Configuration of Wireless Microphone (2)

Figure 12:
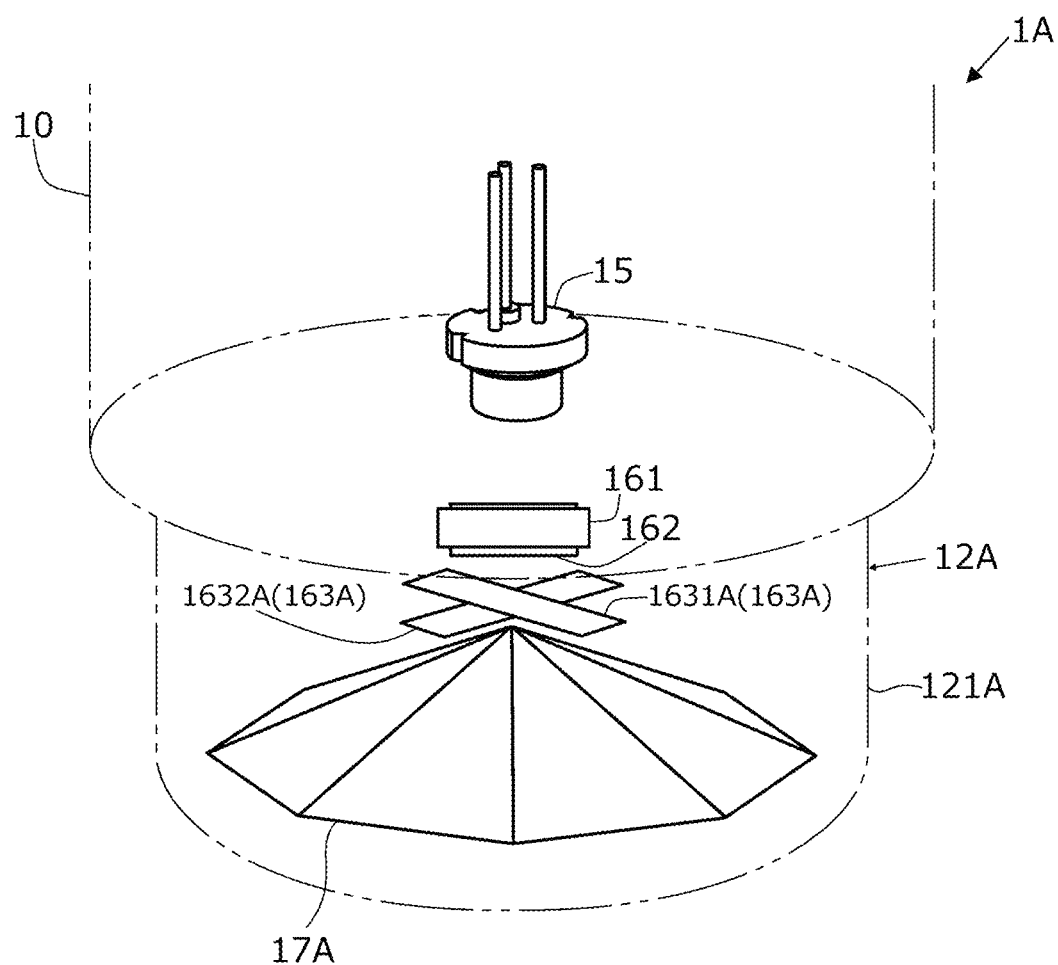
FIG. 12 is a schematic view illustrating another example of a light irradiation device included in a sound signal transmitter constituting a wireless microphone according to the present invention.

FIG. 12 is a schematic view illustrating another example of a light irradiation device included in a sound signal transmitter constituting a microphone.

FIG. 12 illustrates that the light irradiation device is disposed inside a microphone 1A. In FIG. 12, members denoted with the same reference numerals as those of other drawings have the same configurations and functions as those of members illustrated in the other drawings.

The microphone 1A includes the grip housing 10, the head case 11 (see FIG. 1), a radiation case 12A, the driver unit 13 (see FIG. 2), the modulator 14 (see FIG. 2), the light emitter 15, a division part 16A, a reflector 17A, the controller 18 (see FIG. 2), the power receiving terminal 19 (see FIG. 2), the power storage 20 (see FIG. 2), and the circuit board 21 (see FIG. 2). The modulator 14 (see FIG. 2), the light emitter 15, the division part 16A, the reflector 17A, the controller 18 (see FIG. 2), the power receiving terminal 19 (see FIG. 2), the power storage 20 (see FIG. 2), and the circuit board 21 (see FIG. 2) constitute a sound signal transmitter (not illustrated) according to the present invention (second embodiment). The sound signal transmitter generates and outputs a light corresponding to a sound signal from the driver unit 13, thereby transmitting the sound signal, as will be described later. The light emitter 15, the division part 16A, and the reflector 17A constitute a light irradiation device (not illustrated) in the second embodiment.

The radiation case 12A radiates lights (not illustrated) reflected by the reflector 17A to the outside of the microphone 1A. The radiation case 12A includes a diffuser (not illustrated). The diffuser diffuses third divided lights (not illustrated) reflected by the reflector 17A. The diffuser is, for example, a surface with textured coating (not illustrated) disposed on an inner peripheral surface of a cylindrical part 121A and subjected to a textured surface treatment. The surface subjected to the surface treatment has minute irregularities. The third divided lights will be described later.

The division part 16A divides the light L (see FIG. 3) from the light emitter 15 into the divided lights L1 (see FIG. 3), and emits (guides) each of the divided lights L1 to the reflector 17A. The division part 16A includes a plurality of individual division parts (the first division part 161, the second division part 162, and a third division part 163A). Each of the individual division parts divides the light L incident on the division part 16A into the divided lights L1.

The second division part 162 divides each of the two first divided light L11a (see FIG. 6) and first divided light L11b (see FIG. 6) by the first division part 161 into the two second divided lights L12 (see FIG. 7) traveling in different directions. The second division part 162 emits (guides) the four second divided lights L12 (the second divided light L12a, the second divided light L12b, the second divided light L12c, and the second divided light L12d) to the third division part 163A.

The third division part 163A divides each of the second divided light L12a, the second divided light L12b, the second divided light L12c, and the second divided light L12d divided by the second division part 162 into two third divided lights traveling in different directions. The third division part 163A emits the third divided lights (eight third divided lights) to the reflector 17A. That is, the third division part 163A divides the four second divided lights L12 into the eight third divided lights and emits the eight third divided lights to the reflector 17A. The third division part 163A includes a first sheet-shaped member 1631A and a second sheet-shaped member 1632A.

The third division part 163A is disposed between the second division part 162 and the reflector 17A and disposed with a gap from the second division part 162. Specifically, the third division part 163A is disposed below the second division part 162. The gap between the second division part 162 and the third division part 163A is wider than a gap between the first division part 161 and the second division part 162.

Figure 13:
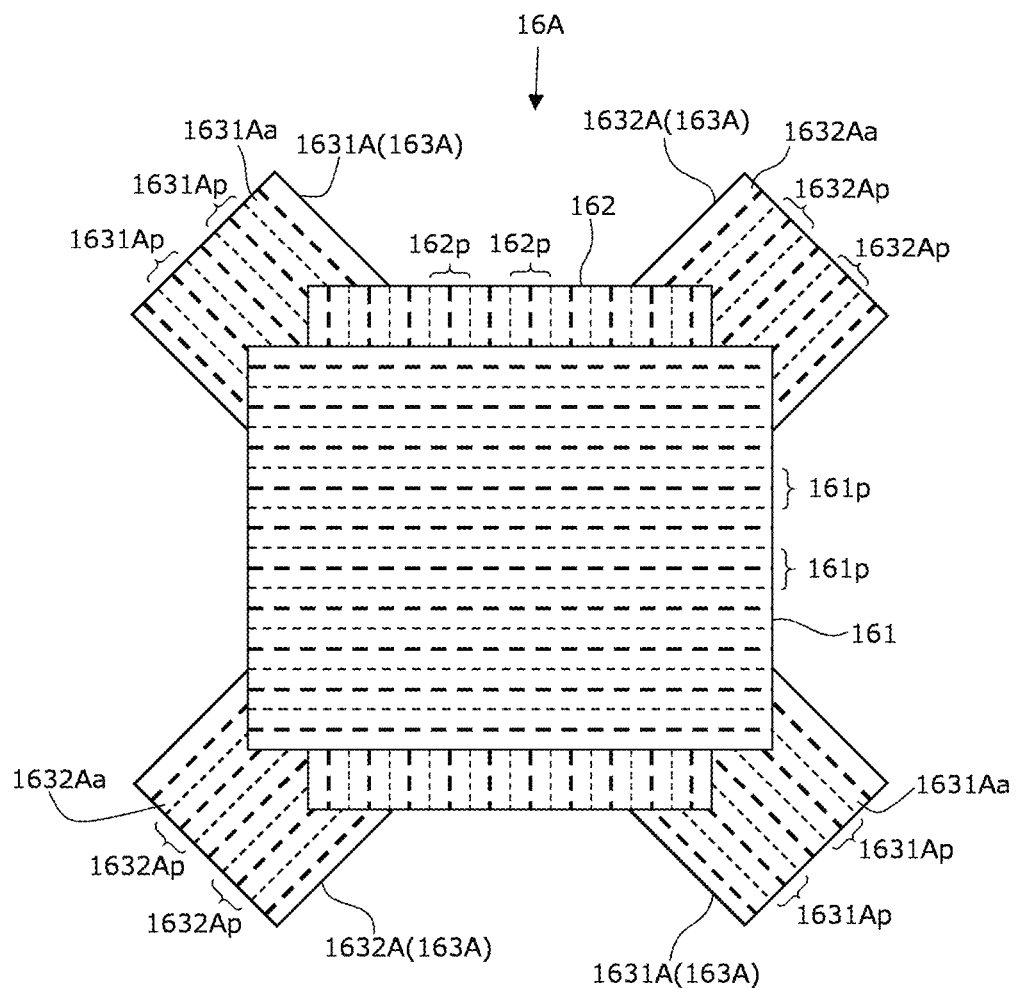
FIG. 13 is a schematic plan view schematically illustrating a division part included in the light irradiation device of FIG. 12.
Figure 14:
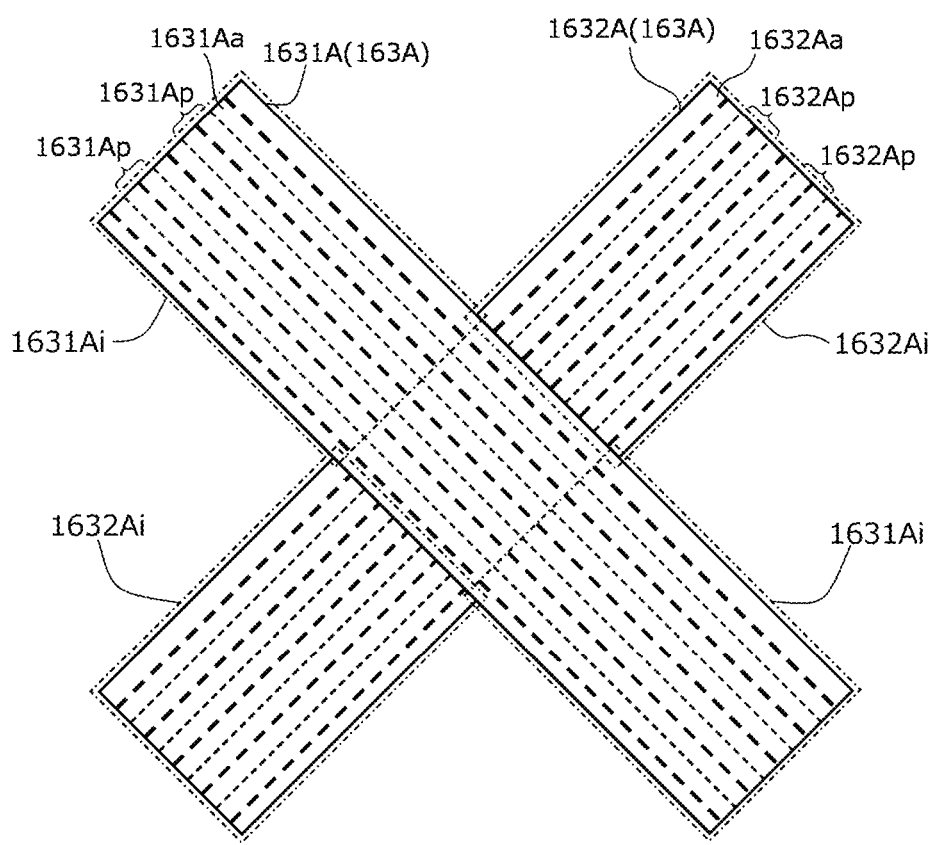
FIG. 14 is a schematic plan view schematically illustrating a third division part included in the division part of FIG. 13.

FIG. 13 is a schematic plan view schematically illustrating the division part 16A. FIG. 14 is a schematic plan view schematically illustrating the third division part 163A.

FIG. 13 illustrates that the respective individual division parts are overlappingly disposed to intersect with one another. FIG. 14 illustrates that the first sheet-shaped member 1631A and the second sheet-shaped member 1632A are overlappingly disposed. Furthermore, in FIG. 13 and FIG. 14, thick broken lines indicate arrangement positions (arrangement) of tops in irregularities and thin broken lines indicate arrangement positions (arrangement) of bottoms in the irregularities.

In FIG. 14, regions surrounded by dashed lines indicate the below-mentioned third incident part and fourth incident part. The regions are illustrated in a wider range than actual regions of the third incident part and the fourth incident part for convenience of description.

The first sheet-shaped member 1631A divides each of the second divided light L12a and the second divided light L12c, among the second divided lights L12 divided by the second division part 162, into two third divided lights (not illustrated) traveling in different directions. The first sheet-shaped member 1631A emits (guides) the four third divided lights to the reflector 17A. That is, the first sheet-shaped member 1631A divides a part of the second divided lights L12 (the second divided light L12a and the second divided light L12c) into the four third divided lights.

The configuration of the first sheet-shaped member 1631A is common to the configuration of the first division part 161 and the configuration of the second division part 162, except for the shape thereof. That is, the first sheet-shaped member 1631A includes a first surface 1631Aa and a second surface (not illustrated). On the first surface 1631Aa, a plurality of convex parts 1631Ap having the same configuration and function as those of the convex parts 161p and 162p are arranged in parallel. That is, the first sheet-shaped member 1631A includes a plurality of prism surfaces (irregularity surfaces). The shape of the first sheet-shaped member 1631A is a rectangular shape that is longer and thinner than the first division part 161 and the second division part 162. An irregularity including two adjacent convex parts 1631Ap and a concave part between them is an example of an irregularity in the present invention. A direction in which each of the irregularities is arranged is a third direction in the present invention.

The second sheet-shaped member 1632A divides each of the second divided light L12b and the second divided light L12d, among the second divided lights L12 divided by the second division part 162, into two third divided lights (not illustrated) traveling in different directions. The second sheet-shaped member 1632A emits the four third divided lights to the reflector 17A. That is, the second sheet-shaped member 1632A divides a part of the second divided lights L12 (the second divided light L12b and the second divided light L12d) into the four third divided lights.

As described above, the third division part 163A divides the four second divided lights L12 into the eight third divided lights.

The configuration of the second sheet-shaped member 1632A is common to the configuration of the first sheet-shaped member 1631A. That is, the second sheet-shaped member 1632A includes a first surface 1632Aa and a second surface (not illustrated). On the first surface 1632Aa, a plurality of convex parts 1632Ap having the same configuration and function as those of the convex parts 1631Ap are arranged in parallel. That is, the second sheet-shaped member 1632A includes a plurality of prism surfaces. The shape of the second sheet-shaped member 1632A is a rectangular shape that is longer and thinner than the first division part 161 and the second division part 162, similarly to the shape of the first sheet-shaped member 1631A. An irregularity including two adjacent convex parts 1632Ap and a concave part between them is an example of an irregularity in the present invention. A direction in which each of the irregularities is arranged is a fourth direction in the present invention.

As illustrated in FIG. 13, the first sheet-shaped member 1631A is disposed to intersect with each of the first division part 161 and the second division part 162. That is, the third direction is different from the first direction and the second direction. Similarly, as illustrated in FIG. 13, the second sheet-shaped member 1632A is disposed to intersect with each of the first division part 161 and the second division part 162. That is, the fourth direction is different from the first direction and the second direction.

As illustrated in FIG. 14, the first sheet-shaped member 1631A is orthogonal to the second sheet-shaped member 1632A and disposed in an X shape in plan view. That is, the third direction is different from the fourth direction.

Each region of the first surface 1631Aa of the first sheet-shaped member 1631A, which do not overlap the second sheet-shaped member 1632A in plan view, is a third incident part 1631Ai in the present invention. That is, the first sheet-shaped member 1631A includes two third incident parts 1631Ai that do not overlap fourth incident parts 1632Ai in plan view. The second divided light L12a is incident on one third incident part 1631Ai and the second divided light L12c is incident on the other third incident part 1631Ai. However, the second divided light L12a and the second divided light L12c are not incident on a part of the first surface 1631Aa of the first sheet-shaped member 1631A, which overlaps the second sheet-shaped member 1632A in plan view.

Each region of the first surface 1632Aa of the second sheet-shaped member 1632A, which do not overlap the first sheet-shaped member 1631A in plan view, is a fourth incident part 1632Ai in the present invention. That is, the second sheet-shaped member 1632A includes two fourth incident parts 1632Ai that do not overlap the third incident parts 1631Ai in plan view. The second divided light L12b is incident on one fourth incident part 1632Ai and the second divided light L12d is incident on the other fourth incident part 1632Ai. However, the second divided light L12b and the second divided light L12d are not incident on a part of the first surface 1632Aa of the second sheet-shaped member 1632A, which overlaps the first sheet-shaped member 1631A in plan view.

It should be noted that the first sheet-shaped member and the second sheet-shaped member may not be orthogonally disposed in plan view. That is, for example, when the second divided light L12a and the second divided light L12c can be incident on the third incident parts of the first sheet-shaped member 1631A and the second divided light L12b and the second divided light L12d can be incident on the fourth incident parts of the second sheet-shaped member 1632A, the first sheet-shaped member and the second sheet-shaped member may be disposed to intersect at an angle other than orthogonal in plan view.

Referring back to FIG. 12, the reflector 17A reflects a part of the divided lights (eight third divided lights) (not illustrated) from the division part 16A (the third division part 163A) and transmits the remaining part of the divided lights. The reflector 17A is disposed below the division part 16A and supported by the support part (not illustrated) in the radiation case 12A. The reflector 17A includes surfaces corresponding to the number of third divided lights divided by the third division part 163A. That is, for example, the reflector 17A has an octagonal pyramid shape, and the eight third divided lights divided by the third division part 163A are subjected to reflection and the like on eight surfaces, except for a bottom surface, on the reflector 17A. The reflector 17A includes a pedestal part (not illustrated) and a reflection surface (not illustrated).

The pedestal part transmits each of the third divided lights transmitted through the reflection surface. Each of the third divided lights transmitted through the reflection surface is transmitted while being refracted in the pedestal part. The pedestal part has an octagonal pyramid shape, and is made of, for example, a synthetic resin having a transmitting property such as polycarbonate. The reflection surface is a surface of the reflector 17A, reflects a part of the third divided lights, and transmits the remaining part of the third divided lights. The reflection surface is, for example, a half mirror (one-way mirror). The reflection surface is configured with the surface of the pedestal part on which a deposition process of a semi-transmissive film (light semi-transmissive film) is provided. Respective surfaces of the reflection surface function as individual reflection surfaces (eight individual reflection surfaces in the second embodiment) corresponding to the third divided lights.

Operation of Wireless Microphone (2)

The operation of the microphone 1A will now be described with reference to FIG. 12. The operation until the light L from the light emitter 15 is divided into the second divided lights L12 (the second divided light L12a, the second divided light L12b, the second divided light L12c, and the second divided light L12d) by the first division part 161 and the second division part 162 is the same as that of the microphone 1 of the first embodiment. Therefore, a description of the operation until the light L from the light emitter 15 is divided into the second divided lights L12 will be omitted.

Each of the second divided lights L12 emitted from the second division part 162 is incident on the third division part 163A.

The second divided light L12a is refracted by the prism surface of the first sheet-shaped member 1631A when passing through one third incident part 1631Ai of the first sheet-shaped member 1631A, and is divided into two third divided lights (not illustrated). Each of the third divided lights divided by the first sheet-shaped member 1631A is emitted (guided) toward a corresponding individual reflection surface (not illustrated) of the reflector 17A.

The second divided light L12c is refracted by the prism surface of the first sheet-shaped member 1631A when passing through the other third incident part 1631Ai of the first sheet-shaped member 1631A, and is divided into two third divided lights (not illustrated). Each of the third divided lights divided by the first sheet-shaped member 1631A is emitted toward a corresponding individual reflection surface (not illustrated) of the reflector 17A.

The second divided light L12b is refracted by the prism surface of the second sheet-shaped member 1632A when passing through one fourth incident part 1632Ai of the second sheet-shaped member 1632A, and is divided into two third divided lights (not illustrated). Each of the third divided lights divided by the second sheet-shaped member 1632A is emitted toward a corresponding individual reflection surface (not illustrated) of the reflector 17A.

The second divided light L12d is refracted by the prism surface of the second sheet-shaped member 1632A when passing through the other fourth incident part 1632Ai of the second sheet-shaped member 1632A, and is divided into two third divided lights (not illustrated). Each of the third divided lights divided by the second sheet-shaped member 1632A is emitted toward a corresponding individual reflection surface (not illustrated) of the reflector 17A.

Then, each of the third divided lights (eight third divided lights) emitted from the third division part 163A is incident on a corresponding individual reflection surface of the reflector 17A. A part of the third divided lights incident on the respective individual reflection surfaces is reflected in each direction. Each of the third divided lights reflected in respective directions is diffused by the diffuser (not illustrated) of the radiation case 12A and radiated to the outside of the microphone 1A from the cylindrical part 121A. On the other hand, the remaining part of the third divided lights incident on the respective individual reflection surfaces is transmitted while being refracted in the reflector 17A. Each of the third divided lights transmitted through the reflector 17A passes through a side of the power receiving terminal (not illustrated), and is radiated to the outside of the microphone 1A from the bottom part (not illustrated) of the radiation case 12A without being incident on the power receiving terminal (without being blocked by the power receiving terminal).

As described above, each of the third divided lights reflected by the respective individual reflection surfaces of the reflector 17A and each of the third divided lights transmitted through the reflector 17A are radiated in different directions.

Effects of Wireless Microphone (2)

Effects of the wireless microphone 1A will now be described.

Figure 15:
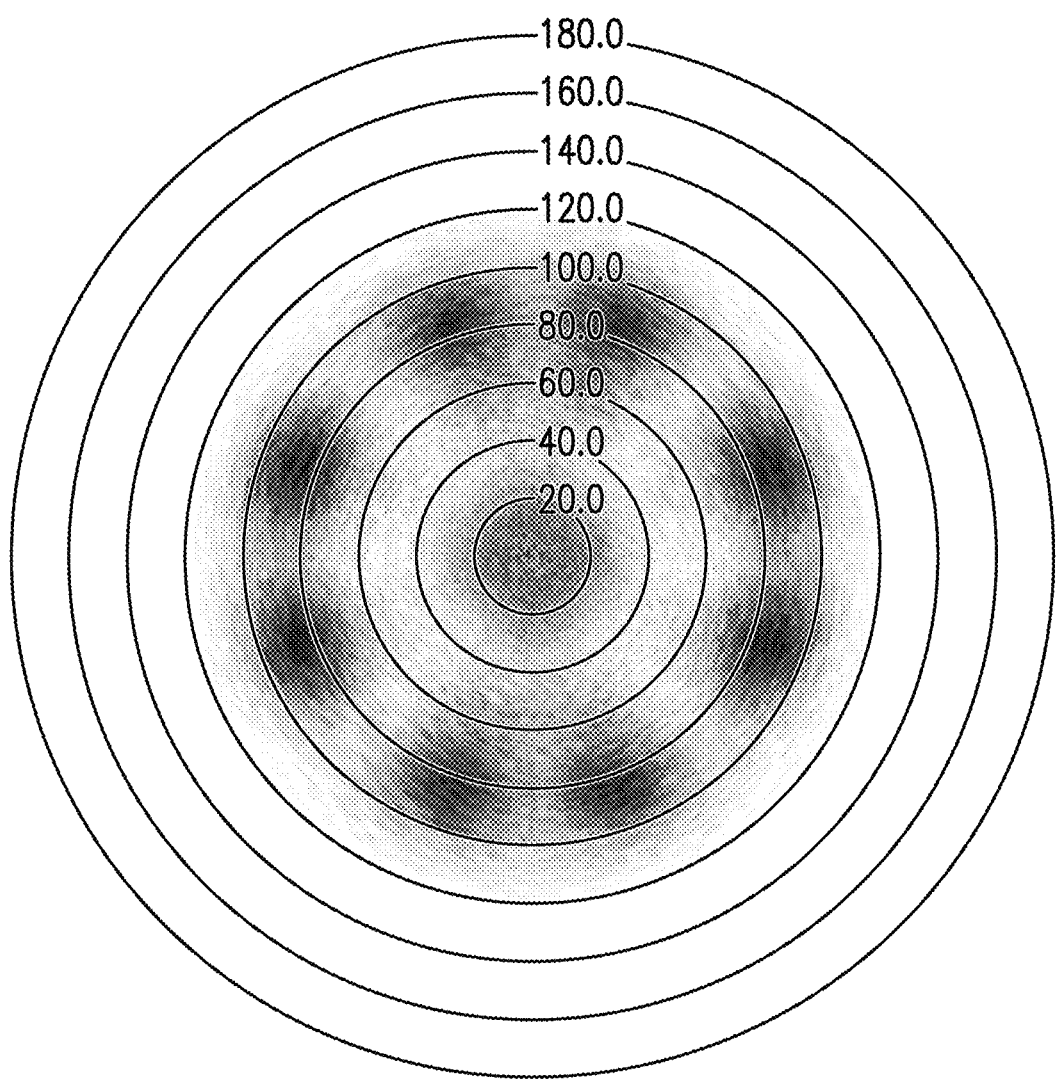
FIG. 15 is a view illustrating a distribution of the radiation intensity of lights reflected by the reflector and the radiation intensity of the lights transmitted through the reflector in a virtual circle obtained with a virtual sphere expanded from a position of 180° with respect to 0°, which employs an optical axis direction of a light from a light emitter included in the light irradiation device of FIG. 12 as a center axis.

FIG. 15 is a view illustrating a distribution of the radiation intensity of the third divided lights in a virtual circle obtained with a virtual sphere expanded from a position of 180° with respect to 0°, which employs the direction (0° to 180°) of the optical axis Ax as a center axis.

In FIG. 15, dark parts indicate parts with a high radiation intensity.

As illustrated in FIG. 15, in each of the eight third divided lights, each of the third divided lights reflected by the respective individual reflection surfaces has a distribution of the radiation intensity in a range of about 80° to about 100°. In particular, the radiation intensity of each of the third divided lights reflected by the respective individual reflection surfaces is high near 90°.

Furthermore, in each of the eight third divided lights, third divided lights transmitted through the reflector 17A and radiated to the outside of the microphone 1A from the bottom part of the radiation case 12A have a distribution of the radiation intensity in a range of about 0° to about 20°. In particular, the radiation intensity of the third divided lights transmitted through the reflector 17 is high near 0°.

As described above, the direction of the optical axis Ax and a direction in which each of the third divided lights reflected by the respective individual reflection surfaces is guided are equal to "approximately 90°". That is, each of the third divided lights reflected by the respective individual reflection surfaces is output in a direction orthogonal to the optical axis Ax.

Furthermore, in each of the eight third divided lights, each of the third divided lights reflected by the respective individual reflection surfaces is approximately uniformly radiated in the circumferential direction of the optical axis Ax. That is, angles formed by the respective optical axis directions of the third divided lights reflected by the respective individual reflection surfaces are equal to "approximately 45°".

Conclusion (2)

According to the second embodiment described above, the division part 16A divides the light L from the light emitter 15 (one laser diode) into the eight third divided lights with the first division part 161, the second division part 162, and the third division part 163A. The eight third divided lights are incident on the reflector 17A, are subjected to reflection and the like by corresponding individual reflection surfaces, and are radiated to the outside of the microphone 1A. That is, the sound signal transmitter constituting the microphone 1A uniformly outputs the light from the light emitter 15 in the circumferential direction of the sound signal transmitter, regardless of the light emitter 15 including one laser diode. That is, the microphone 1A according to the second embodiment uniformly outputs the light from the light emitter 15 in the circumferential direction of the sound signal transmitter, regardless of the orientation of the microphone 1A. As a result, the microphone 1A according to the second embodiment implements stable communication with the light receiver.

Furthermore, the arrangement position of each constituent member of the microphone 1A is set such that each of the third divided lights transmitted through the reflector 17A without being reflected by the reflector 17A is radiated below the microphone 1A from the bottom part of the radiation case 12A without being blocked by the power receiving terminal 19. As a result, the microphone 1A according to the second embodiment also outputs the light from below the microphone 1A.

Moreover, according to the second embodiment described above, an angle formed between the direction of the optical axis Ax and the direction in which each of the third divided lights reflected by the respective individual reflection surfaces of the reflector 17A is guided is "approximately 90°". That is, each of the third divided lights reflected by the respective individual reflection surfaces is output in a direction orthogonal to the circumferential direction with respect to the optical axis Ax. That is, the microphone 1A according to the second embodiment uniformly outputs the light from the light emitter 15 in the circumferential direction of the sound signal transmitter. As a result, the microphone 1A according to the second embodiment implements stable communication with the light receiver.

Moreover, the reflector 17A has an octagonal pyramid shape. Therefore, even if the incident position of the third divided light on the individual reflection surface is shifted (even if the third divided light is incident to any position of the individual reflection surface), the optical axis direction of each of the third divided lights reflected by the respective individual reflection surfaces does not change as long as an incident angle to each of the individual reflection surfaces is constant. That is, the microphone 1A according to the second embodiment uniformly outputs the light from the light emitter 15 in the circumferential direction of the sound signal transmitter, regardless of the orientation of the microphone 1A. As a result, the microphone 1A according to the second embodiment implements stable communication with the light receiver.

Moreover, according to the second embodiment described above, among the eight third divided lights, each of the third divided lights reflected by the respective individual reflection surfaces is approximately uniformly radiated in the circumferential direction of the optical axis Ax. That is, in the microphone 1A, regardless of the orientation of the microphone 1A, angles formed by the respective optical axis directions of the third divided lights reflected by the respective individual reflection surfaces are equal to "approximately 45°". That is, the microphone 1A according to the second embodiment uniformly outputs the light from the light emitter 15 in the circumferential direction of the sound signal transmitter. As a result, in the microphone 1 according to the second embodiment, an infrared light is transmitted uniformly in the circumferential direction, so that the infrared light can be received in the light receiver.

Moreover, according to the second embodiment described above, similarly to the first embodiment, even if the arrangement position of the light emitter 15 in the microphone 1A is shifted in any of the X direction, the Y direction, and the Z direction, no large difference in the relation between the angles of the third divided lights, which are subjected to reflection and the like in the reflector 17A, with respect to the optical axis Ax and the radiation intensity occurs. Furthermore, even if any of the light emitter 15, the division part 16A, and the reflector 17A is disposed to be inclined in the microphone 1A, no large difference in the relation between the angles of the third divided lights, which are subjected to reflection and the like in the reflector 17A, with respect to the optical axis Ax and the radiation intensity occurs. That is, the relation between the angles of the third divided lights subjected to reflection and the like in the reflector 17A with respect to the optical axis Ax and the radiation intensity is hardly affected by the assembly error of the light irradiation device constituting the sound signal transmitter. That is, as compared to the conventional transmitter, in the sound signal transmitter constituting the microphone 1A according to the second embodiment, the influence of the assembly error of the sound signal transmitter on the relation between the angles of the third divided lights, which are subjected to reflection and the like in the reflector 17A, with respect to the optical axis Ax and the radiation intensity is small. Therefore, when the sound signal transmitter is assembled, the light emitter 15 may not be strictly disposed with the reflector 17A such that the center axis (apex) of the reflector 17A is located on the optical axis of the light L from the light emitter 15. As a result, as compared to the conventional transmitter, the microphone 1A is easily assembled. Moreover, the arrangement position of the light emitter 15, the division part 16A, and the reflector 17A may be shifted due to an impact of a drop at the time of use after the microphone 1A is assembled, similarly to the microphone according to the first embodiment. However, as compared to a state before the arrangement position is shifted, no large difference in the relation between the angles of the third divided lights, which are subjected to reflection and the like in the reflector 17A in the microphone 1A, with respect to the optical axis Ax and the radiation intensity occurs. That is, the microphone 1A according to the second embodiment uniformly outputs the light L from the light emitter part 15 in the circumferential direction of the sound signal transmitter even if a shift or inclination occurs in the constituent member of the light irradiation device constituting the sound signal transmitter.

It should be noted that the third division part may not include the first sheet-shaped member and the second sheet-shaped member as long as the third division part can divide each of the four second divided lights divided by the second division part into two divided lights to obtain eight third divided lights. That is, for example, the third division part may include four sheet-shaped members and divide each of the second divided lights into two divided lights by the respective sheet-shaped members.

Moreover, the shape of the reflector may not be a pyramid shape as long as the reflector includes a surface on which the third divided lights divided by the division part are incident. That is, for example, the shape of the reflector may be a truncated pyramid shape.

Moreover, the shape of the reflector may not be an octagonal pyramid shape as long as the reflector can reflect and transmit the third divided lights divided by and incident from the division part. That is, for example, the shape of the reflector may be a conical shape.

Conclusion (Others)

The light output from the light emitter in the present invention is not limited to the infrared light as long as the light can carry information. That is, for example, the light output from the light emitter may be a light in the band of an ultraviolet light or a visible light.

Furthermore, the light emitter in the present invention is not limited to the laser diode. That is, for example, the light emitter may be an LED.

Moreover, the light receiver in the present invention may be disposed on a wall surface.

The invention claimed is:

1. A sound signal transmitter comprising:
a light source that outputs a light corresponding to a sound signal from a sound source;
a division part that divides the light from the light source into a plurality of divided lights; and
a reflector that reflects the divided lights from the division part.

2. The sound signal transmitter according to claim 1, wherein
the division part includes a first division part and a second division part,
the first division part divides the light from the light source into a plurality of first divided lights, and
the second division part divides each of the first divided lights into a plurality of second divided lights.

3. The sound signal transmitter according to claim 2, wherein
the first division part includes a first incident surface including a plurality of irregularities arranged in a first direction,
the second division part includes a second incident surface including a plurality of irregularities arranged in a second direction, and
the first direction is different from the second direction.

4. The sound signal transmitter according to claim 3, wherein the first direction is orthogonal to the second direction.

5. The sound signal transmitter according to claim 4, wherein
the division part includes a third division part, and
the third division part divides each of the second divided lights into a plurality of third divided lights.

6. The sound signal transmitter according to claim 5, wherein
the third division part includes a first sheet-shaped member and a second sheet-shaped member,
the first sheet-shaped member includes a third incident part including a plurality of irregularities arranged in a third direction and on which a part of the second divided lights is incident,
the second sheet-shaped member includes a fourth incident part including a plurality of irregularities arranged in a fourth direction and on which a part of the second divided lights is incident, and
the third direction is different from the fourth direction.

7. The sound signal transmitter according to claim 6, wherein
the first sheet-shaped member is disposed to intersect with the second sheet-shaped member, and
the third incident part does not overlap the fourth incident part.

8. The sound signal transmitter according to claim 6, wherein the third direction is orthogonal to the fourth direction.

9. The sound signal transmitter according to claim 6, wherein the third direction and the fourth direction are different from the first direction and the second direction.

10. The sound signal transmitter according to claim 1, wherein
the division part is a sheet-shaped member including a first surface and a second surface,
the light from the light source is incident on the first surface, and
the divided lights are emitted from the second surface.

11. The sound signal transmitter according to claim 1, wherein the reflector includes a reflection surface that reflects the divided lights.

12. The sound signal transmitter according to claim 11, wherein
the division part divides the light from the light source into four divided lights, and
the reflection surface includes individual reflection surfaces corresponding to the divided lights, respectively.

13. The sound signal transmitter according to claim 1, wherein the reflector transmits a part of each of the divided lights.

14. The sound signal transmitter according to claim 1, further comprising:
a diffuser that diffuses the divided lights reflected by the reflector.

15. The sound signal transmitter according to claim 1, wherein the light source is a laser diode.

16. A wireless microphone comprising:
a microphone unit that collects sound waves from a sound source and generates a sound signal; and
a sound signal transmitter that outputs a light corresponding to the sound signal, wherein
the sound signal transmitter is the sound signal transmitter according to claim 1.

17. The wireless microphone according to claim 16, further comprising:

a power storage that stores power to the light source; and a power receiving terminal that receives the power to the power storage, wherein the power receiving terminal is disposed on an opposite side of the light source with respect to the reflector, the reflector transmits a part of each of the divided lights, and the part of the divided light transmitted through the reflector is not incident on the power receiving terminal.

18. The wireless microphone according to claim 16, further comprising:

a radiation case that accommodates the reflector, wherein the radiation case diffuses the divided lights reflected by the reflector.

19. The wireless microphone according to claim 18, wherein the radiation case has a cylindrical shape and includes a diffuser that diffuses the divided lights reflected by the reflector, and the diffuser is disposed on an inner peripheral surface of the radiation case.

\* \* \* \* \*